(12) United States Patent
Li et al.

(10) Patent No.: US 12,185,319 B2
(45) Date of Patent: Dec. 31, 2024

(54) COMMUNICATION METHOD AND APPARATUS

(71) Applicant: Huawei Technologies Co., Ltd., Shenzhen (CN)

(72) Inventors: Xinxian Li, Shanghai (CN); Jinlin Peng, Shanghai (CN); Jiehua Xiao, Shenzhen (CN); Yongzhao Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 325 days.

(21) Appl. No.: 17/707,505

(22) Filed: Mar. 29, 2022

(65) Prior Publication Data

US 2022/0225373 A1    Jul. 14, 2022

Related U.S. Application Data

(63) Continuation of application No. PCT/CN2019/109719, filed on Sep. 30, 2019.

(51) Int. Cl.
  *H04W 72/12* (2023.01)
  *H04L 5/00* (2006.01)
  *H04W 8/24* (2009.01)
  *H04W 72/04* (2023.01)
  *H04W 72/0453* (2023.01)
  *H04W 72/20* (2023.01)

(52) U.S. Cl.
  CPC .......... *H04W 72/20* (2023.01); *H04L 5/0094* (2013.01); *H04W 8/24* (2013.01); *H04W 72/0453* (2013.01)

(58) Field of Classification Search
  CPC ... H04W 72/20; H04W 8/24; H04W 72/0453; H04L 5/0094
  See application file for complete search history.

(56) References Cited

U.S. PATENT DOCUMENTS

| | | |
|---|---|---|
| 2011/0268032 A1 | 11/2011 | Kim et al. |
| 2017/0279580 A1 | 9/2017 | Chen et al. |
| 2018/0255452 A1 | 9/2018 | Wu |
| 2018/0324778 A1* | 11/2018 | Farajidana ........ H04W 72/0446 |
| 2022/0052813 A1* | 2/2022 | Si ..................... H04W 72/0446 |

FOREIGN PATENT DOCUMENTS

| | | |
|---|---|---|
| CN | 101778482 A | 7/2010 |
| CN | 101860964 A | 10/2010 |
| CN | 101877911 A | 11/2010 |
| CN | 102223638 A | 10/2011 |
| WO | 2019069285 A1 | 4/2019 |

* cited by examiner

*Primary Examiner* — Derrick V Rose
(74) *Attorney, Agent, or Firm* — Slater Matsil, LLP

(57) ABSTRACT

A communication method and an apparatus are provided. The method includes: A communication apparatus may send uplink capability information to a network device, where the uplink capability information includes at least one of the following: a maximum quantity of uplink carriers configured for the communication apparatus, a maximum quantity of uplink carriers supported by the communication apparatus, and a maximum quantity of channels supported by the communication apparatus. Further, the communication apparatus receives first information from the network device, where the first information indicates an uplink carrier used for uplink transmission, and performs uplink transmission with the network device on the uplink carrier. The communication apparatus may be a terminal device.

16 Claims, 12 Drawing Sheets

COMMUNICATION METHOD AND APPARATUS

CROSS-REFERENCE TO RELATED APPLICATIONS

This application is a continuation of International Application No. PCT/CN2019/109719, filed on Sep. 30, 2019, the disclosure of which is hereby incorporated by reference in its entirety.

TECHNICAL FIELD

This application relates to the field of wireless communication technologies, and in particular, to a communication method and an apparatus.

BACKGROUND

A 5th generation (5G) communication system may support coexistence of a plurality of service types, for example, a URLLC (Ultra-Reliable and Low-Latency Communication, ultra-reliable low-latency communication) service, an eMBB (enhanced mobile broadband) service, and an mMTC (Massive Machine Type Communication, massive machine-type communications) service. As a result, a service volume is flexible and variable, and a coverage requirement is relatively high.

How to satisfy a flexible and variable service volume and a communication requirement with a relatively high coverage requirement still needs to be further studied.

SUMMARY

In view of this, this application provides a communication method and an apparatus, to improve uplink transmission performance, thereby satisfying a flexible and variable service volume and/or a communication requirement with a relatively high coverage requirement.

According to a first aspect, an embodiment of this application provides a communication method. The method may be applied to a communication apparatus, and the communication apparatus may be a terminal device or may be a chip used in a terminal device. In the method, the communication apparatus may send uplink capability information to a network device, where the uplink capability information includes at least one of the following: a maximum quantity of uplink carriers configured for the communication apparatus, a maximum quantity of uplink carriers supported by the communication apparatus, and a maximum quantity of channels supported by the communication apparatus. Further, the communication apparatus receives first information from the network device, where the first information indicates an uplink carrier used for uplink transmission, and performs uplink transmission with the network device on the uplink carrier.

According to the foregoing method, the terminal device reports the uplink capability information to the network device, so that the network device can indicate, based on the uplink capability information, the uplink carrier used by the terminal device for uplink transmission. This can effectively ensure uplink transmission performance, for example, can effectively increase an uplink transmission opportunity, or can effectively avoid an uplink transmission error caused by relatively poor channel quality, to satisfy a flexible and variable service volume and/or a communication requirement with a relatively high coverage requirement.

In a possible design, when the uplink capability information includes the maximum quantity of uplink carriers configured for the communication apparatus and the maximum quantity of uplink carriers supported by the communication apparatus, the first information indicates N uplink carriers used for uplink transmission, and the N uplink carriers are located in M uplink carriers configured for the communication apparatus; and the performing uplink transmission with the network device on the uplink carrier includes: performing uplink transmission with the network device on the N uplink carriers, where M is an integer greater than 1, N is an integer greater than or equal to 1, and N≤M; and M is less than or equal to the maximum quantity of uplink carriers configured for the communication apparatus, and N is less than or equal to the maximum quantity of uplink carriers supported by the communication apparatus.

In a possible design, when the uplink capability information further includes the maximum quantity of channels supported by the communication apparatus, the method further includes: receiving second information from the network device, where the second information indicates Q channels, and the Q channels correspond to the N uplink carriers; and the performing uplink transmission with the network device on the uplink carrier includes: performing uplink transmission with the network device on the Q channels corresponding to the N uplink carriers, where Q is less than or equal to the maximum quantity of channels supported by the communication apparatus.

According to the foregoing method, the terminal device can determine, based on an indication of the network device, the Q channels corresponding to the N uplink carriers. In other words, the network device can indicate, based on the maximum quantity of channels that are supported by the terminal device and that are in the uplink capability information, the channels corresponding to the N uplink carriers, so that the network device can switch, based on an actual requirement, the channels corresponding to the N uplink carriers, to reduce power consumption of the terminal device.

In a possible design, the method further includes: receiving third information from the network device, where the third information is used to configure, for the communication apparatus, the M uplink carriers and at least one channel corresponding to each of the M uplink carriers, where a sum of quantities of channels corresponding to each of the M uplink carriers is less than or equal to the maximum quantity of channels supported by the communication apparatus.

In this manner, when configuring the M uplink carriers, the network device may also configure the at least one channel corresponding to each of the M uplink carriers, so that the network device does not need to subsequently indicate, to the terminal device, the channel corresponding to the uplink carrier. This can effectively save transmission resources.

In a possible design, the uplink carrier used for uplink transmission is located in a frequency range covered by a first frequency band combination, and the first frequency band combination includes at least one frequency band. For example, the M uplink carriers may alternatively be located in the frequency range covered by the first frequency band combination. In this manner, because the M uplink carriers are located in the frequency range covered by the first frequency band combination, it is convenient to switch, in the M uplink carriers, the uplink carrier used for uplink transmission.

In a possible design, the method further includes: sending fourth information to the network device, where the fourth information is used to indicate at least one frequency band combination supported by the communication apparatus, and the at least one frequency band combination includes the first frequency band combination.

According to a second aspect, an embodiment of this application provides a communication method. The method may be applied to a communication apparatus, and the communication apparatus may be a network device or may be a chip used in a network device. In the method, the communication apparatus receives uplink capability information from a terminal device, where the uplink capability information includes at least one of the following: a maximum quantity of uplink carriers configured for the terminal device, a maximum quantity of uplink carriers supported by the terminal device, and a maximum quantity of channels supported by the terminal device. Further, the communication apparatus sends first information to the terminal device, where the first information indicates an uplink carrier used for uplink transmission, and performs uplink transmission with the terminal device on the uplink carrier.

According to the foregoing method, the network device can indicate, based on the uplink capability information, the uplink carrier used by the terminal device for uplink transmission, so that uplink transmission performance can be effectively ensured, for example, an uplink transmission opportunity can be effectively increased, or an uplink transmission error caused by relatively poor channel quality can be effectively avoided, to satisfy a flexible and variable service volume and/or a communication requirement with a relatively high coverage requirement.

In a possible design, when the uplink capability information includes the maximum quantity of uplink carriers configured for the terminal device and the maximum quantity of uplink carriers supported by the terminal device, the first information indicates N uplink carriers used for uplink transmission, and the N uplink carriers are located in M uplink carriers configured for the terminal device; and the performing uplink transmission with the terminal device on the uplink carrier includes: performing uplink transmission with the terminal device on the N uplink carriers, where M is an integer greater than 1, N is an integer greater than or equal to 1, and N≤M; and M is less than or equal to the maximum quantity of uplink carriers configured for the terminal device, and N is less than or equal to the maximum quantity of uplink carriers supported by the terminal device.

In a possible design, when the uplink capability information further includes the maximum quantity of channels supported by the terminal device, the method further includes: sending second information to the terminal device, where the second information indicates Q channels, and the Q channels correspond to the N uplink carriers; and the performing uplink transmission with the terminal device on the uplink carrier includes: performing uplink transmission with the terminal device on the Q channels corresponding to the N uplink carriers, where Q is less than or equal to the maximum quantity of channels supported by the terminal device.

In a possible design, the method further includes: sending third information to the terminal device, where the third information is used to configure, for the terminal device, the M uplink carriers and at least one channel corresponding to each of the M uplink carriers, where a sum of quantities of channels corresponding to each of the M uplink carriers is less than or equal to the maximum quantity of channels supported by the terminal device.

In a possible design, the uplink carrier used for uplink transmission is located in a frequency range covered by a first frequency band combination, and the first frequency band combination includes at least one frequency band.

In a possible design, the method further includes: receiving fourth information from the terminal device, where the fourth information is used to indicate at least one frequency band combination supported by the terminal device, and the at least one frequency band combination includes the first frequency band combination.

According to a third aspect, an embodiment of this application provides an apparatus. The apparatus has a function of implementing the communication apparatus (for example, the terminal device) in the first aspect. For example, the apparatus includes a module, a unit, or means corresponding to the steps performed by the terminal device in the first aspect. The function, the unit, or the means may be implemented by software, or may be implemented by hardware, or may be implemented by hardware executing corresponding software.

In a possible design, the apparatus includes a processing unit and a communication unit. Functions performed by the processing unit and the communication unit may correspond to the steps performed by the terminal device in the first aspect.

In a possible design, the apparatus includes a processor, and may further include a transceiver. The transceiver is configured to receive and send a signal, and the processor executes program instructions, to complete the method performed by the terminal device in any one of the first aspect or the possible designs or implementations of the first aspect.

The apparatus may further include one or more memories. The memory is configured to be coupled to the processor. The one or more memories may be integrated with the processor, or may be disposed independent of the processor. This is not limited in this application.

In a possible design, the memory stores computer program instructions and/or data required for implementing the function of the terminal device in the first aspect. The processor may execute the computer program instructions stored in the memory, to complete the method performed by the terminal device in any one of the first aspect or the possible designs or implementations of the first aspect.

According to a fourth aspect, an embodiment of this application provides an apparatus. The apparatus has a function of implementing the communication apparatus (for example, the network device) in the second aspect. For example, the apparatus includes a module, a unit, or means corresponding to the steps performed by the network device in the second aspect. The function, the unit, or the means may be implemented by software, or may be implemented by hardware, or may be implemented by hardware executing corresponding software.

In a possible design, the apparatus includes a processing unit and a communication unit. Functions performed by the processing unit and the communication unit may correspond to the steps performed by the network device in the second aspect.

In a possible design, the apparatus includes a processor, and may further include a transceiver. The transceiver is configured to receive and send a signal, and the processor executes program instructions, to complete the method performed by the network device in any one of the second aspect or the possible designs or implementations of the second aspect.

The apparatus may further include one or more memories. The memory is configured to be coupled to the processor. The one or more memories may be integrated with the processor, or may be disposed independent of the processor. This is not limited in this application.

In a possible design, the memory stores computer program instructions and/or data required for implementing the function of the network device in the second aspect. The processor may execute the computer program instructions stored in the memory, to complete the method performed by the network device in any one of the second aspect or the possible designs or implementations of the second aspect.

According to a fifth aspect, an embodiment of this application provides a computer-readable storage medium. The computer storage medium stores computer-readable instructions; and when a computer reads and executes the computer-readable instructions, the computer is enabled to perform the method in any one of the first aspect and the second aspect or the possible designs of the first aspect and the second aspect.

According to a sixth aspect, an embodiment of this application provides a computer program product; and when a computer reads and executes the computer program product, the computer is enabled to perform the method in any one of the first aspect and the second aspect or the possible designs of the first aspect and the second aspect.

According to a seventh aspect, an embodiment of this application provides a chip. The chip is connected to a memory, and is configured to read and execute a software program stored in the memory, to implement the method in any one of the first aspect and the second aspect or the possible designs of the first aspect and the second aspect.

According to an eighth aspect, an embodiment of this application provides a communication system. The communication system includes the terminal device in any one of the first aspect or the possible designs of the first aspect and the network device in any one of the second aspect or the possible designs of the second aspect.

DETAILED DESCRIPTION OF ILLUSTRATIVE EMBODIMENTS

Figure 1:
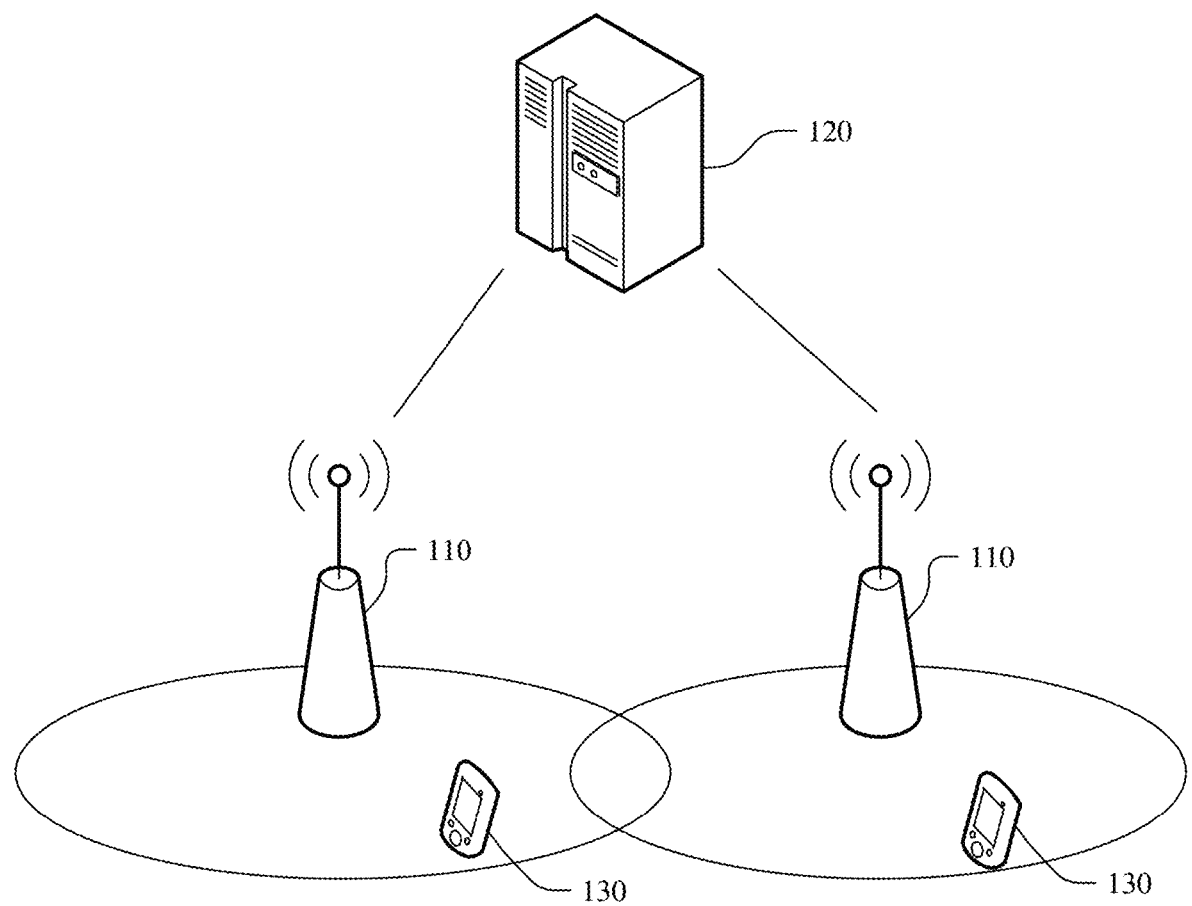
FIG. 1 is a schematic diagram of a network architecture to which an embodiment of this application is applicable.

The following describes the technical solutions in embodiments of the present invention with reference to the accompanying drawings in the embodiments of the present invention. It is clear that the described embodiments are merely a part rather than all of the embodiments of the present invention.

Some terms in the embodiments of this application are first described, to help a person skilled in the art have a better understanding.

(1) Terminal device: The terminal device may be a wireless terminal device that can receive scheduling and indication information of a network device. The wireless terminal device may be a device that provides a user with voice and/or data connectivity, a handheld device having a wireless connection function, or another processing device connected to a wireless modem. The terminal device may communicate with one or more core networks or the internet through a radio access network (RAN). The terminal device may be a mobile terminal device, such as a mobile phone (which is also referred to as a "cellular" phone or a mobile phone), a computer, and a data card, for example, may be a portable, pocket-sized, handheld, computer built-in, or vehicle-mounted mobile apparatus, which exchanges voice and/or data with the radio access network. For example, the terminal device may be a device such as a personal communication service (PCS) phone, a cordless phone, a session initiation protocol (SIP) phone, a wireless local loop (WLL) station, a personal digital assistant (PDA), a tablet computer (Pad), and a computer having a wireless transceiver function. The wireless terminal device may also be referred to as a system, a subscriber unit, a subscriber station, a mobile station, a mobile station (MS), a remote station, an access point (AP), a remote terminal device (remote terminal), an access terminal device (access terminal), a user terminal device (user terminal), a user agent, a subscriber station (SS), customer premises equipment (CPE), a terminal, user equipment (UE), a mobile terminal (MT), or the like. Alternatively, the terminal device may be a wearable device and a terminal device in a next generation communication system such as a 5G communication system, a terminal device in a future evolved public land mobile network (PLMN), or the like.

(2) Network device: The network device is a device in a wireless network. For example, the network device may be a radio access network (RAN) node (or device) that enables a terminal to access the wireless network, and may also be referred to as a base station. Currently, some examples of the RAN device are: a next generation NodeB (generation Node B, gNB) in a 5G communication system, a transmission reception point (TRP), an evolved NodeB (evolved Node B, eNB), a radio network controller (RNC), a NodeB (Node B, NB), a base station controller (BSC), a base transceiver station (BTS), a home base station (for example, a home evolved NodeB or a home Node B, HNB), a baseband unit (BBU), a wireless fidelity (Wi-Fi) access point (AP), or the like. In addition, in a network structure, the network device may include a centralized unit (CU) node, a distributed unit (DU) node, or a RAN device including a CU node and a DU node. In addition, in another possible case, the network device may be another apparatus that provides a wireless communication function for the terminal device. A specific technology and a specific device form that are used by the network device are not limited in the embodiments of this application. For ease of description, in the embodiments of this application, the apparatus that provides the wireless communication function for the terminal device is referred to as the network device.

(3) The terms "system" and "network" may be interchangeably used in the embodiments of this application. "At least one" means one or more, and "a plurality of" means two or more. The term "and/or" describes an association relationship between associated objects, and represents that three relationships may exist. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof means any combination of these items, including any combination of singular items (pieces) or plural items (pieces). For example, "at least one of A, B, and C" includes A, B, C, AB, AC, BC, or ABC.

In addition, unless otherwise stated, ordinal numbers such as "first" and "second" in the embodiments of this application are used to distinguish between a plurality of objects, and are not used to limit an order, a time sequence, priorities, or importance of the plurality of objects. For example, first information and second information are merely used to distinguish between different information, and do not indicate different priorities, importance, or the like of the two types of information.

FIG. 1 is a schematic diagram of a network architecture to which an embodiment of this application is applicable. As shown in FIG. 1, a terminal device 130 may access a wireless network, to obtain a service of an external network (for example, the internet) through the wireless network, or communicate with another device through the wireless network, for example, may communicate with another terminal device. The wireless network includes a radio access network (RAN) device (or a network device) no and a core network (CN) device 120. The RAN device no is configured to connect the terminal device 130 to the wireless network, and the CN device 120 is configured to manage the terminal device and provide a gateway for communicating with the external network. It should be understood that a quantity of devices in the communication system shown in FIG. 1 is merely used as an example. This embodiment of this application is not limited thereto. During actual application, the communication system may further include more terminal devices 130 and more RAN devices no, and may further include another device.

In a CN, a plurality of CN devices 120 may be included. When the network architecture shown in FIG. 1 is applicable to a 5G communication system, the CN device 120 may be an access and mobility management function (AMF) entity, a session management function (SMF) entity, a user plane function (UPF) entity, or the like. When the network architecture shown in FIG. 1 is applicable to an LTE communication system, the CN device 120 may be a mobility management entity (MME), a serving gateway (S-GW), and the like.

Figure 2:
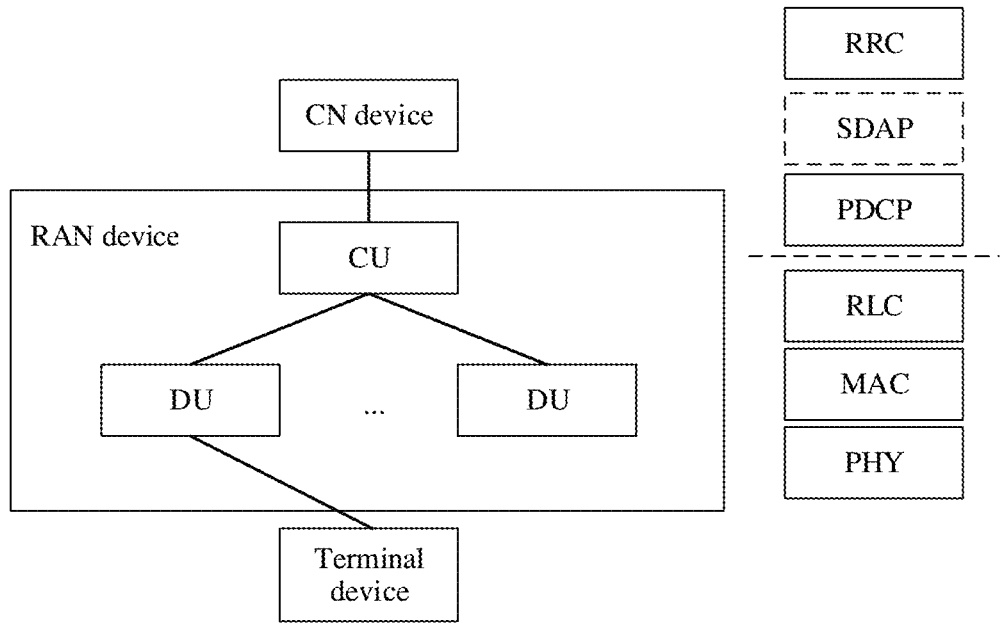
FIG. 2 is a schematic diagram of another network architecture to which an embodiment of this application is applicable.

FIG. 2 is a schematic diagram of another network architecture to which an embodiment of this application is applicable. As shown in FIG. 2, the network architecture includes a CN device, a RAN device, and a terminal device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or a part of the radio frequency apparatus is implemented remotely from the baseband apparatus and a remaining part is integrated into the baseband apparatus. For example, in an LTE communication system, a RAN device (eNB) includes a baseband apparatus and a radio frequency apparatus. The radio frequency apparatus may be remotely disposed relative to the baseband apparatus. For example, a remote radio unit (RRU) is remotely disposed relative to a BBU.

Communication between the RAN device and the terminal device complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include the functions of the protocol layers such as the PDCP layer, the RLC layer, the MAC layer, and the physical layer. In a possible implementation, a service data adaptation protocol (SDAP) layer may be further included above the PDCP layer.

The RAN device may implement the functions of the protocol layers such as the RRC layer, the PDCP layer, the RLC layer, and the MAC layer through one node or a plurality of nodes. For example, in an evolved structure, the RAN device may include a CU and DU, and a plurality of DUs may be centrally controlled by one CU. As shown in FIG. 2, the CU and the DU may be divided based on a protocol layer of a wireless network. For example, functions of the PDCP layer and a layer above the PDCP layer are set in the CU, and functions of protocol layers below the PDCP layer, such as the RLC layer and the MAC layer, are set in the DU.

Division based on the protocol layer is merely an example, and division may alternatively be performed based on another protocol layer. For example, division is performed based on the RLC layer. Functions of the RLC layer and a protocol layer above the RLC layer are set in the CU, and a function of a protocol layer below the RLC layer is set in the DU. Alternatively, division is performed based on a protocol layer. For example, a part of functions of the RLC layer and a function of a protocol layer above the RLC layer are set in the CU, and a remaining function of the RLC layer and a function of a protocol layer below the RLC layer are set in the DU. In addition, division may alternatively be performed in another manner. For example, the division is performed based on a latency. A function whose processing time needs to satisfy a latency requirement is set in the DU, and a function whose processing time does not need to satisfy the latency requirement is set in the CU.

In addition, the radio frequency apparatus may be not placed in the DU but is placed remotely from the DU, or may be integrated into the DU, or a part of the radio frequency apparatus is placed remotely from the DU and a remaining part is integrated into the DU. This is not limited herein.

Figure 3:
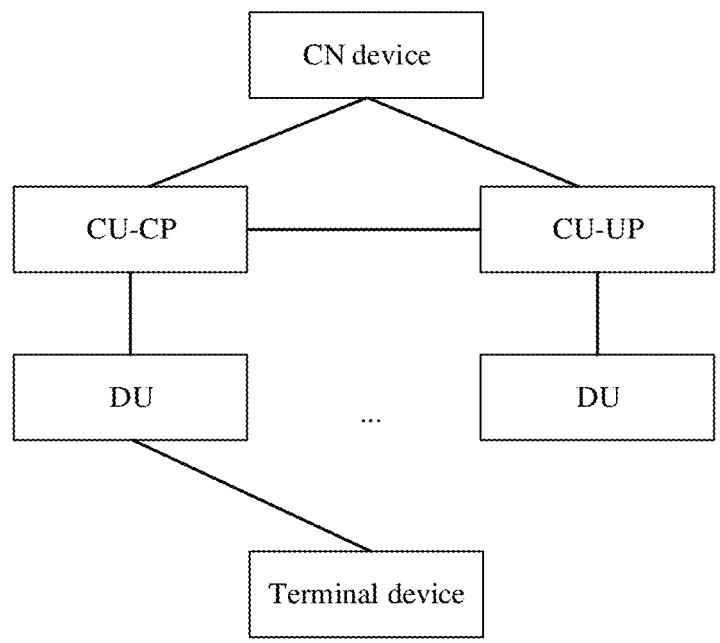
FIG. 3 is a schematic diagram of another network architecture to which an embodiment of this application is applicable.

FIG. 3 is a schematic diagram of another network architecture to which an embodiment of this application is applicable. Compared with the network architecture shown in FIG. 2, in FIG. 3, a control plane (CP) and a user plane (UP) of a CU may alternatively be separated and implemented by dividing the CU into different entities. The entities are separately a CP CU entity (namely, a CU-CP entity) and a UP CU entity (namely, a CU-UP entity).

In the foregoing network architecture, signaling generated by the CU may be sent to a terminal device through a DU, or signaling generated by the terminal device may be sent to the CU through the DU. The DU may transparently transmit the signaling to the terminal device or the CU by directly encapsulating the signaling at a protocol layer without parsing the signaling. In the following embodiments, if transmission of such signaling between the DU and the terminal device is involved, sending or receiving of the signaling by the DU includes this scenario. For example, signaling at an RRC layer or a PDCP layer is finally processed as signaling at a PHY layer and sent to the terminal device, or is converted from received signaling at a PHY layer. In this architecture, it may also be considered that the signaling at the RRC layer or the PDCP layer is sent by the DU, or sent by the DU and the radio frequency apparatus.

The network architecture shown in FIG. 1, FIG. 2, or FIG. 3 is applicable to various communication systems of a radio access technology (RAT). For example, the communication system may be an LTE communication system, or may be a 5G (which is also referred to as new radio (NR)) communication system, or may be a transition system between an LTE communication system and a 5G communication system, or certainly may be a future communication system. The transition system may also be referred to as a 4.5G communication system. The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

An apparatus in the following embodiments of this application may be located in a terminal device or a network device based on a function implemented by the apparatus. When the foregoing CU-DU structure is used, the network device may be a CU node, a DU node, or a RAN device including a CU node and a DU node.

Based on the network architecture shown in FIG. 1, FIG. 2, or FIG. 3, the embodiments of this application provide a communication method, to improve uplink transmission performance, thereby satisfying a flexible and variable service volume and/or a communication requirement with a relatively high coverage requirement. For example, the method may include: A terminal device sends uplink capability information to a network device, where the uplink capability information includes at least one of the following: a maximum quantity of uplink carriers configured for the terminal device, a maximum quantity of uplink carriers supported by the terminal device, and a maximum quantity of channels supported by the terminal device. Further, the terminal device receives first information from the network device, and performs uplink transmission with the network device on an uplink carrier indicated by the first information. In this manner, the terminal device reports the uplink capability information to the network device, so that the network device can indicate, based on the uplink capability information, the uplink carrier used by the terminal device for uplink transmission. This can effectively ensure uplink transmission performance, for example, can effectively increase an uplink transmission opportunity, or can effectively avoid an uplink transmission error caused by relatively poor channel quality, to satisfy a flexible and variable service volume and/or a communication requirement with a relatively high coverage requirement.

The following further describes the technical solutions of this application in detail with reference to the accompanying drawings of this specification.

Embodiment 1

Figure 4A:
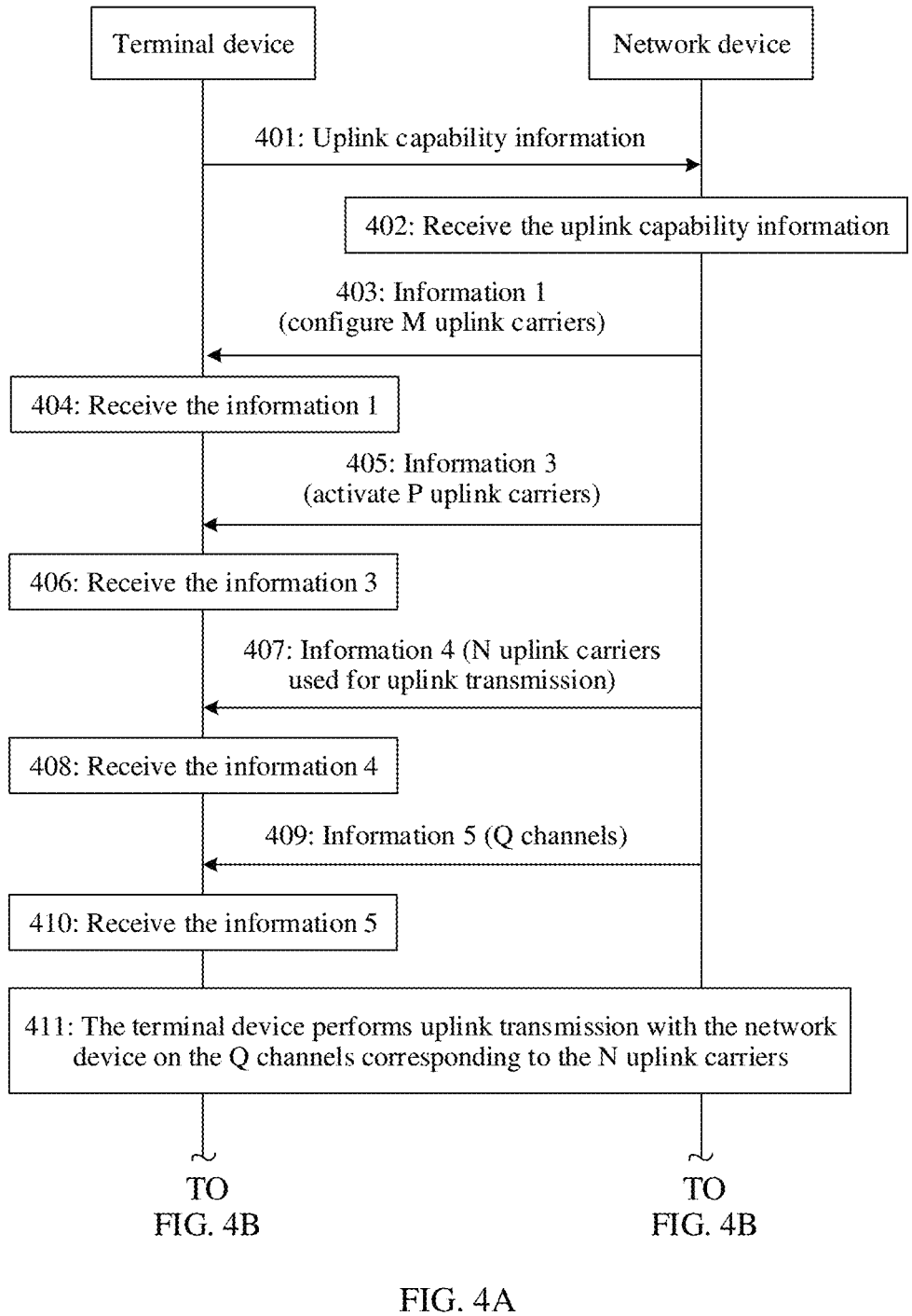
FIG. 4A and FIG. 4B are a schematic flowchart corresponding to a communication method according to Embodiment 1 of this application.
Figure 4B:
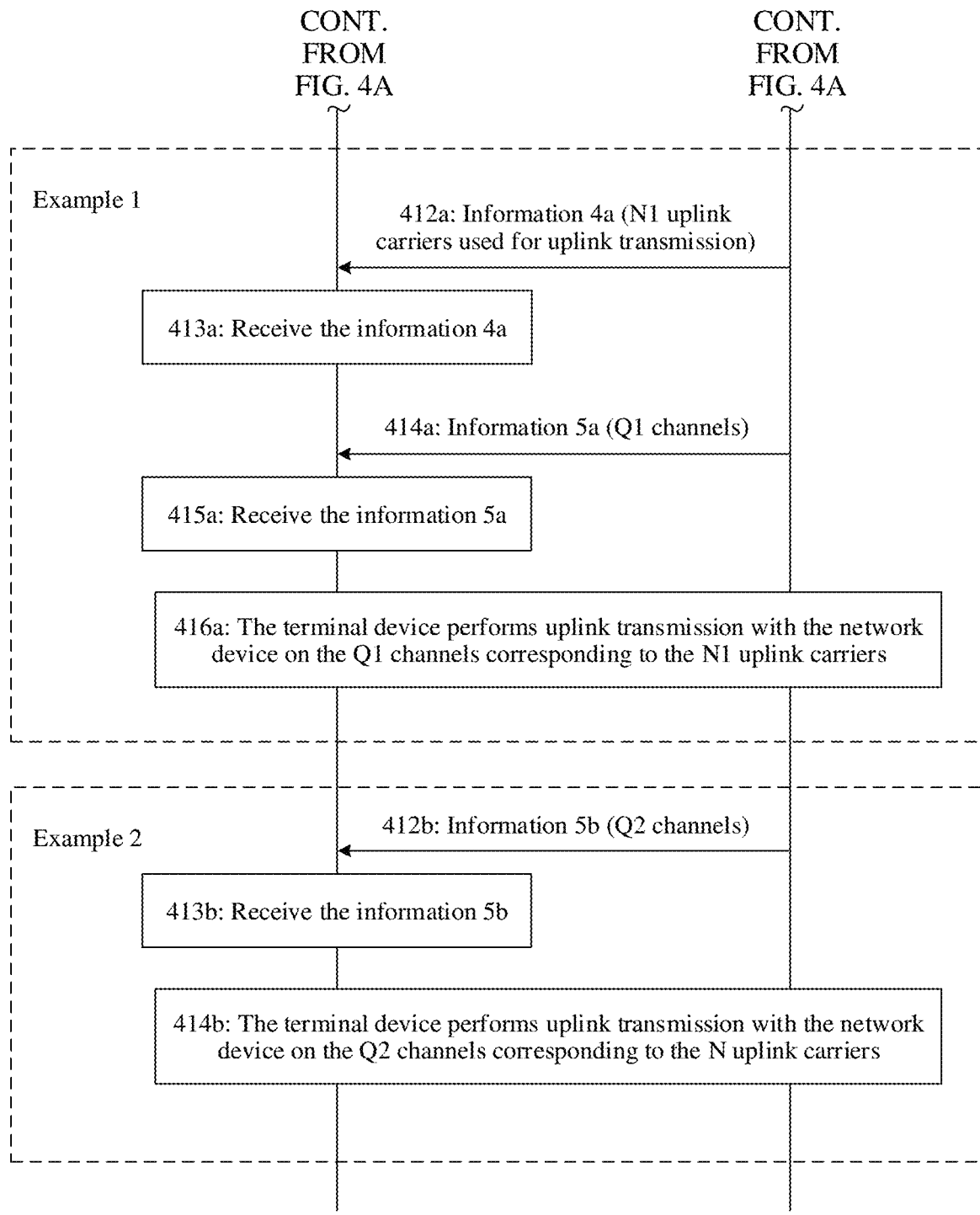

An embodiment of this application provides a communication method. FIG. 4A and FIG. 4B are a schematic flowchart corresponding to the method. In the following description process, an example in which the method is applied to the network architecture shown in FIG. 1 is used. In addition, the method may be performed by two communication apparatuses. The two communication apparatuses are, for example, a first communication apparatus and a second communication apparatus. The first communication apparatus may be a network device or a communication apparatus that can support the network device to implement functions required for the method, or certainly may be another communication apparatus such as a chip or a chip system. The second communication apparatus may be a terminal device or a communication apparatus that can support the terminal device to implement functions required for the method, or certainly may be another communication apparatus such as a chip or a chip system. For ease of description, the following uses an example in which the method is performed by a network device and a terminal device, namely, an example in which the first communication apparatus is the network device and the second communication apparatus is the terminal device. If this embodiment is applied to the network architecture shown in FIG. 1, the network device described below for performing the embodiment shown in FIG. 4A and FIG. 4B may be the network device (or the RAN device) in the system architecture shown in FIG. 1, and the terminal device described below for performing the embodiment shown in FIG. 4A and FIG. 4B may be the terminal device in the network architecture shown in FIG. 1.

FIG. 4A and FIG. 4B are a schematic flowchart corresponding to a communication method according to Embodiment 1 of this application. As shown in FIG. 4A and FIG. 4B, the method includes the following steps.

Step 401: A terminal device sends uplink capability information to a network device.

Correspondingly, in step 402, the network device receives the uplink capability information sent by the terminal device.

For example, the terminal device may send the uplink capability information to the network device in a plurality of implementations. In a possible implementation, the terminal device may actively send the uplink capability information to the network device. For example, when accessing the network device in a contention-based random access process, the terminal device may send the uplink capability information to the network device by using a first message, or referred to as a preamble sequence, in the random access process, or may send the uplink capability information to the network device by using a third message, or referred to as a message 3 (MSG3), in the random access process. For example, when accessing the network device in a non-contention-based random access process, the terminal device may send the uplink capability information to the network device by using a first message, or referred to as a preamble sequence, in the random access process. Alternatively, after accessing the network device, the terminal device may send the uplink capability information to the network device by using RRC signaling. This is not specifically limited. In another possible implementation, the network device may send a capability query message to the terminal device. Correspondingly, after receiving the capability query message from the network device, the terminal device sends the uplink capability information to the network device.

The uplink capability information is explained and described below.

In this embodiment of this application, a new uplink capability is introduced, and may be referred to as a first uplink capability, a super uplink capability, or another possible name. This is not specifically limited.

For example, parameters associated with the first uplink capability may include one or more of the following: (1) a maximum quantity of uplink carriers configured for the terminal device; (2) a maximum quantity of uplink carriers supported by the terminal device; (3) a maximum quantity of channels supported by the terminal device; and (4) a maximum quantity of uplink carriers activated by the terminal device. The maximum quantity of uplink carriers configured for the terminal device may be understood as a maximum quantity of uplink carriers that can be configured for the terminal device. For example, if a value is 4, a quantity of uplink carriers configured by the network device for the terminal device may be less than or equal to 4. The maximum quantity of uplink carriers supported by the terminal device may be understood as a maximum quantity of uplink carriers that are simultaneously used for uplink transmission and that are supported by the terminal device. For example, if a value is 2, a quantity of uplink carriers that are used for uplink transmission and that are indicated by the network device to the terminal device may be less than or equal to 2. Herein, a difference between the maximum quantity of uplink carriers configured for the terminal device and the maximum quantity of uplink carriers supported by the terminal device is that: The maximum quantity of uplink carriers configured for the terminal device is a maximum value of a quantity of uplink carriers that can be configured by the network device for the terminal device, and the maximum quantity of uplink carriers supported by the terminal device is a maximum value of a quantity of uplink carriers that can be simultaneously used for uplink transmission and that are indicated by the network device. For example, the network device configures four uplink carriers for the terminal device. If the maximum quantity of uplink carriers supported by the terminal device is 3, the quantity of uplink carriers that are simultaneously used for uplink transmission and that are indicated by the network device is less than or equal to 3. The maximum quantity of channels supported by the terminal device may be understood as a maximum quantity of radio frequency channels supported by the terminal device. The radio frequency channel herein may be understood as a transmit radio frequency channel, and the transmit radio frequency channel may also be referred to as a transmit radio frequency path, a transmit radio frequency resource, or a transmitter. An uplink carrier activated by the terminal device is located in an uplink carrier configured by the network device for the terminal device, and the maximum quantity of uplink carriers activated by the terminal device may be less than or equal to the maximum quantity of uplink carriers configured for the terminal device.

In an example, all parameters associated with the first uplink capability may be predefined in a protocol. For example, the parameters associated with the first uplink capability include the items (1), (2), and (3), and it is predefined in the protocol that the maximum quantity of uplink carriers configured for the terminal device is 4, the maximum quantity of uplink carriers supported by the terminal device is 3, and the maximum quantity of channels supported by the terminal device is 2. In this case, the uplink capability information may be used to indicate whether the terminal device supports the first uplink capability. For example, the uplink capability information includes one bit. If a value of the bit is 1, it indicates that the terminal device supports the first uplink capability; or if a value of the bit is 0, it indicates that the terminal device does not support the first uplink capability. Correspondingly, after receiving the uplink capability information, if the network device determines that the terminal device supports the first uplink capability, the network device may learn, based on predefined information, of values corresponding to the foregoing three items.

In another example, all parameters associated with the first uplink capability may be reported by the terminal device to the network device; or a part of the parameters are predefined in a protocol, and the other part of the parameters are reported by the terminal device to the network device. In this case, the uplink capability information is used to indicate the uplink capability supported by the terminal device. If the terminal device supports the first uplink capability, the terminal device may send the uplink capability information to the network device. If the terminal device does not support the first uplink capability, the terminal device may no longer send the uplink capability information. In this example, the uplink capability information may include one or more of the foregoing four items. For example, if the parameters associated with the first uplink capability include the items (1), (2), and (3), where the item (1) is predefined in a protocol, the uplink capability information that needs to be reported by the terminal device may include the items (2) and (3). For another example, if the parameters associated with the first uplink capability include the items (1) and (2), where the item (1) is predefined in a protocol, the uplink capability information that needs to be reported by the terminal device may include the item (2). For still another example, if the parameters associated with the first uplink capability include the items (1) and (2), where neither of the items (1) and (2) is predefined in a protocol, the uplink capability information that needs to be reported by the terminal device may include the items (1) and (2).

It should be noted that if the parameters associated with the first uplink capability are reported by the terminal device to the network device, for different terminal devices (for example, a terminal device 1 and a terminal device 2) that support the first uplink capability, values of parameters reported by the terminal device 1 may be different from those reported by the terminal device 2. For example, if the parameters associated with the first uplink capability include the maximum quantity of uplink carriers configured for the terminal device, a value reported by the terminal device 1 may be 4, and a value reported by the terminal device 2 may be 3.

In this embodiment of this application, that the terminal device reports whether the terminal device supports the first uplink capability and that the terminal device reports the parameters associated with the first uplink capability may be decoupled. For example, when all parameters associated with the first uplink capability are predefined in a protocol, the terminal device may report whether the terminal device supports the first uplink capability. For another example, when a part of the parameters associated with the first uplink capability are predefined in a protocol, the terminal device may report the other part of the parameters. In this case, when receiving the other part of the parameters reported by the terminal device, the network device may consider that the terminal device supports the first uplink capability. When the network device does not receive the other part of the parameters reported by the terminal device, the network device may consider that the terminal device does not support the first uplink capability. For still another example, if a part of the parameters associated with the first uplink capability are predefined in a protocol, the terminal device may report whether the terminal device supports the first uplink capability, and report the other part of the parameters. In this case, a default value may be preset for the other part of the parameters. If the terminal device reports that the terminal device supports the first uplink capability, but does not report the other part of the parameters, a value of the other part of the parameters may be the default value.

The following mainly uses an example in which the parameters associated with the first uplink capability include the items (1), (2), (3), and (4) for description.

Step 403: The network device may send information 1 to the terminal device based on the uplink capability information, where the information 1 is used to configure M uplink carriers for the terminal device. M is less than or equal to the maximum quantity of uplink carriers configured for the terminal device.

Correspondingly, in step 404, the terminal device receives the information 1 sent by the network device.

For example, the network device may send higher layer signaling to the terminal device. The higher layer signaling includes the information 1, and the higher layer signaling may be RRC signaling.

For example, the M uplink carriers may be located in a frequency range covered by a same frequency band combination (for example, a first frequency band combination), that is, only a carrier configured on the frequency band combination can support the first uplink capability.

For example, the frequency band combination may include at least one frequency band, and any two of the at least one frequency band may overlap or do not overlap at all. A frequency band in this embodiment of this application may also be referred to as a frequency band, or may be a frequency segment or a frequency range. The frequency range covered by the frequency band combination may be understood as a union set of frequency bands included in the frequency band combination. Table 1 shows examples of some possible frequency bands in a 5G communication system. For example, a frequency range (which is a frequency range of uplink coverage) covered by a band n51 in Table 1 is 285400 Hz to 286400 Hz.

TABLE 1

Examples of frequency bands

| Frequency band | Frequency range of uplink coverage Start frequency-<step size> end frequency (First-<Step size>-Last) | Frequency range of downlink coverage Start frequency-<step size> end frequency (First-<Step size>-Last) |
|---|---|---|
| n1 | 384000-<20>-396000 | 422000-<20>-434000 |
| n2 | 370000-<20>-382000 | 386000-<20>-398000 |
| n3 | 342000-<20>-357000 | 361000-<20>-376000 |

TABLE 1-continued

Examples of frequency bands

| Frequency band | Frequency range of uplink coverage Start frequency-<step size> end frequency (First-<Step size>-Last) | Frequency range of downlink coverage Start frequency-<step size> end frequency (First-<Step size>-Last) |
|---|---|---|
| n5 | 164800-<20>-169800 | 173800-<20>-178800 |
| n7 | 500000-<20>-514000 | 524000-<20>-538000 |
| n8 | 176000-<20>-183000 | 185000-<20>-192000 |
| n20 | 166400-<20>-172400 | 158200-<20>-164200 |
| n28 | 140600-<20>-149600 | 151600-<20>-160600 |
| n38 | 514000-<20>-524000 | 514000-<20>-524000 |
| n41 | 499200-<3>-537999 | 499200-<3>-537999 |
| n50 | 286400-<20>-303400 | 286400-<20>-303400 |
| n51 | 285400-<20>-286400 | 285400-<20>-286400 |
| n66 | 342000-<20>-356000 | 422000-<20>-440000 |
| n70 | 339000-<20>-342000 | 399000-<20>-404000 |
| n71 | 132600-<20>-139600 | 123400-<20>-130400 |
| n74 | 285400-<20>-294000 | 295000-<20>-303600 |
| n75 | N/A | 286400-<20>-303400 |
| n76 | N/A | 285400-<20>-286400 |
| n77 | 620000-<1>-680000 | 620000-<1>-680000 |
| n78 | 620000-<1>-653333 | 620000-<1>-653333 |
| n79 | 693334-<1>-733333 | 693334-<1>-733333 |
| n80 | 342000-<20>-357000 | N/A |
| n81 | 176000-<20>-183000 | N/A |
| n82 | 166400-<20>-172400 | N/A |
| n83 | 140600-<20>-149600 | N/A |
| n84 | 384000-<20>-396000 | N/A |

Figure 5A:
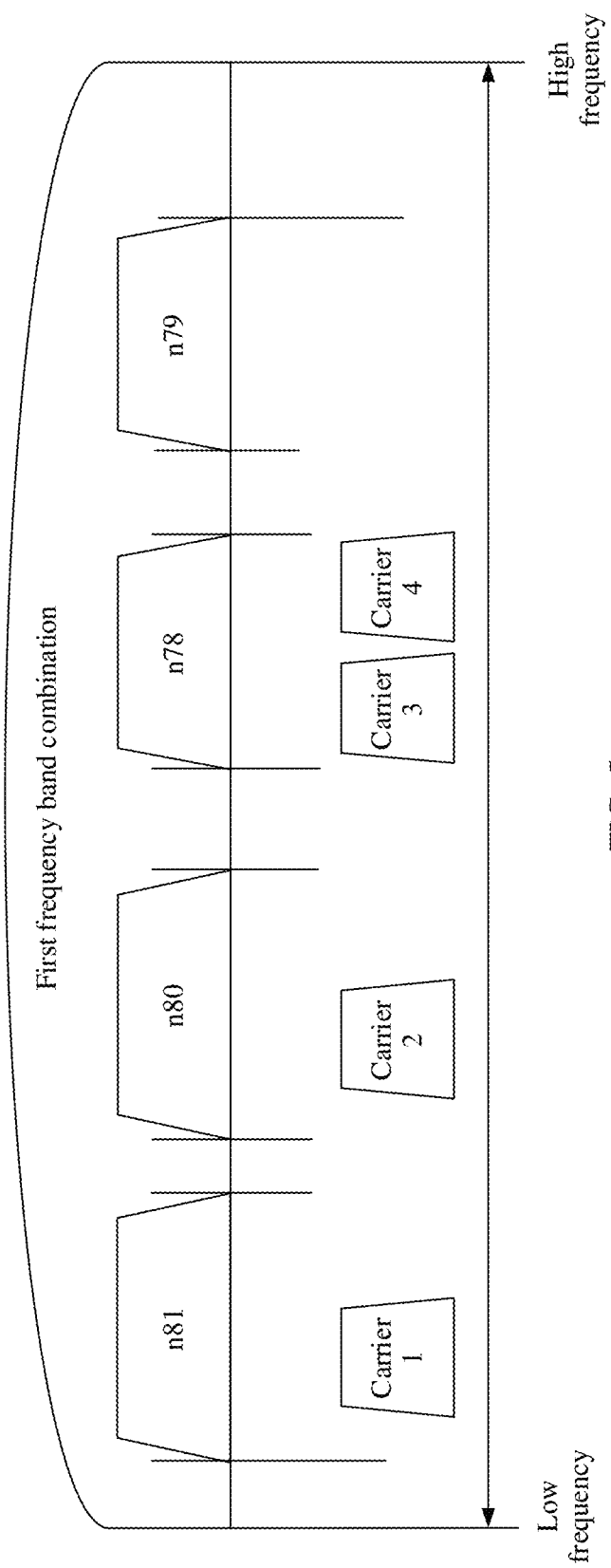
FIG. 5a shows an example of configuring a plurality of uplink carriers on a first frequency band combination according to an embodiment of this application.
Figure 5B:
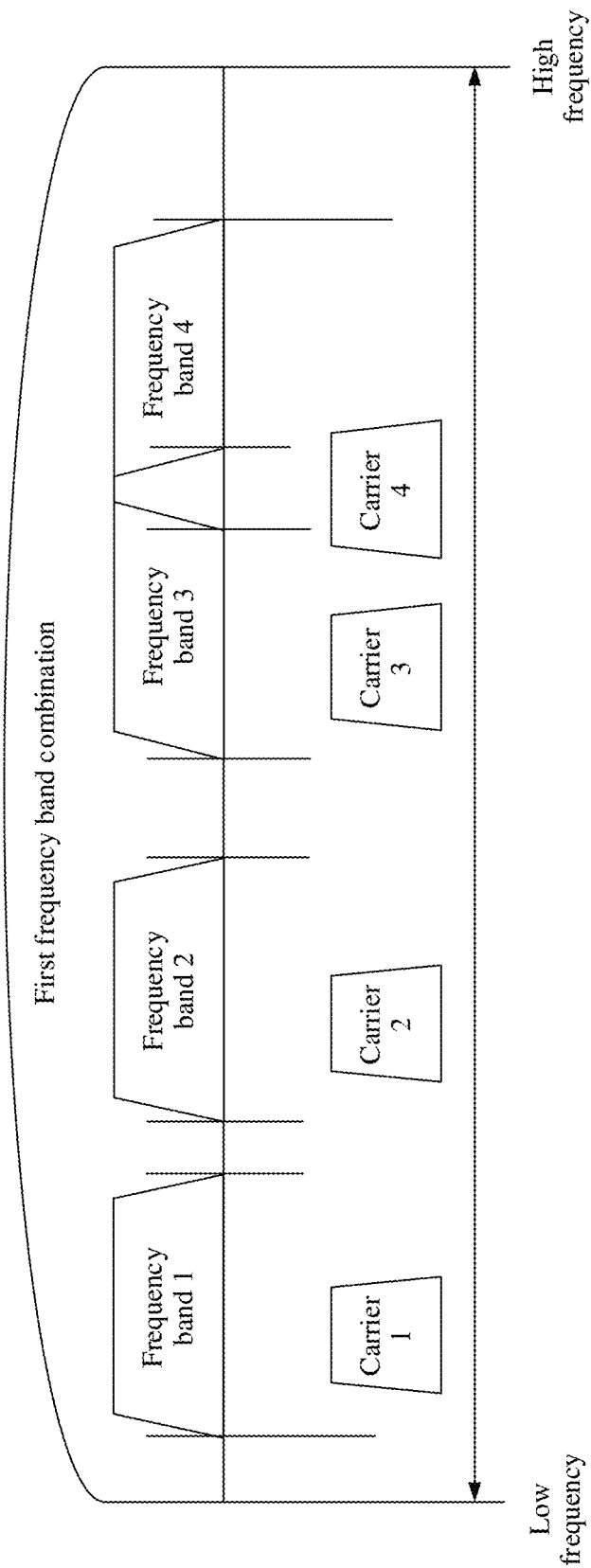
FIG. 5b shows another example of configuring a plurality of uplink carriers on a first frequency band combination according to an embodiment of this application.

In this embodiment of this application, the M uplink carriers may all be located on a frequency band included in the first frequency band combination, or the M uplink carriers may be separately located on different frequency bands included in the first frequency band combination. This is not specifically limited. When two frequency bands included in the first frequency band combination partially overlap, one uplink carrier may be located on the two frequency bands. For example, refer to FIG. 5*a*. The first frequency band combination includes four frequency bands: n78, n79, n80, and n81. If the M uplink carriers include a carrier 1, a carrier 2, a carrier 3, and a carrier 4, in an example, the carrier 1 may be located in a frequency range covered by n78, the carrier 2 may be located in a frequency range covered by n79, and the carrier 3 and the carrier 4 may be located in a frequency range covered by n80. For another example, refer to FIG. 5*b*. The first frequency band combination includes four frequency bands: a frequency band 1, a frequency band 2, a frequency band 3, and a frequency band 4. The frequency band 3 and the frequency band 4 partially overlap. If the M uplink carriers include a carrier 1, a carrier 2, a carrier 3, and a carrier 4, in an example, the carrier 1 may be located in a frequency range covered by the frequency band 1, the carrier 2 may be located in a frequency range covered by the frequency band 2, the carrier 3 may be located in a frequency range covered by the frequency band 3, and the carrier 4 may be located in a frequency range covered by the frequency band 3 and the frequency band 4.

For example, a frequency distance between any two frequency bands included in the frequency band combination that supports the first uplink capability may be less than or equal to a preset threshold. The frequency distance between the two frequency bands may be understood as a distance between center frequencies of the two frequency bands, and the preset threshold may be set by a person skilled in the art based on an actual requirement and experience.

In an example, at least one frequency band combination that supports the first uplink capability may be predefined in a protocol, and the at least one frequency band combination includes the first frequency band combination. Therefore, when configuring a carrier for the terminal device, the network device may select one frequency band combination from the frequency band combinations predefined in the protocol, for example, select the first frequency band combination, and configure the M uplink carriers for the terminal device in the frequency range covered by the first frequency band combination. For example, the frequency band combinations that are predefined in the protocol and that support the first uplink capability includes a frequency band combination 1 and a frequency band combination 2. The frequency band combination 1 includes frequency bands n78 to n82, and the frequency band combination 2 includes frequency bands n28 to n41. In this case, all uplink carriers (for example, four uplink carriers) configured by the network device for the terminal device may only be in a frequency range covered by the frequency bands n78 to n82 or a frequency range covered by the frequency bands n28 to n41. However, it cannot be understood as that the network device configures four uplink carriers for the terminal device, where two uplink carriers are in the frequency range covered by the frequency bands n78 to n82, and the other two uplink carriers are in the frequency range covered by the frequency bands n28 to n41.

In another example, before step 403, the terminal device may send information 2 to the network device, where the information 2 is used to indicate at least one frequency band combination supported by the terminal device (where the terminal device supports the first uplink capability on the at least one frequency band combination), and the at least one frequency band combination includes a first frequency band combination. Correspondingly, after receiving the information 2, the network device may select one frequency band combination from the frequency band combinations reported by the terminal device, for example, select the first frequency band combination, and configure M uplink carriers for the terminal device in a frequency range covered by the first frequency band combination. It should be noted that if the terminal device supports the first uplink capability, the terminal device may send the information 2. If the terminal device does not support the first uplink capability, the terminal device may not send the information 2, that is, may not report the at least one frequency band combination that supports the first uplink capability.

It should be noted that the maximum quantity of channels supported by the terminal device may be related to the at least one frequency band combination reported by the terminal device. For example, a correspondence between the frequency band combination and the maximum quantity of channels may be predefined. For example, if the at least one frequency band combination reported by the terminal device includes a frequency band combination 1 and a frequency band combination 2, the maximum quantity of channels that are supported by the terminal device and that are included in the uplink capability information reported by the terminal device may include a maximum quantity of channels corresponding to the frequency band combination 1 and a maximum quantity of channels corresponding to the frequency band combination 2. For example, when the M uplink carriers configured by the network device are in a frequency range covered by the frequency band combination 1, a quantity of channels used for uplink transmission may be indicated to the terminal device based on the maximum quantity of channels corresponding to the frequency band combination 1. In an example, when reporting the at least one frequency band combination, the terminal device may simultaneously report a maximum quantity of channels corresponding to each of the at least one frequency band combination (namely, a maximum quantity of channels supported by the terminal device on each frequency band combination). It may be understood that all frequency band combinations in the at least one frequency band combination may correspond to a same maximum quantity of channels.

It should be noted that, in this embodiment of this application, a specific manner of selecting, by the network device, a frequency band combination from the frequency band combinations predefined in the protocol or the frequency band combinations reported by the terminal device is not limited. For example, the frequency band combination may be randomly selected.

In a possible implementation, the information 1 may be further used to configure, for the terminal device, at least one channel corresponding to each of the M uplink carriers. For example, M=4, the maximum quantity of channels supported by the terminal device is 2 (which are respectively a channel 1 and a channel 2), and the four uplink carriers configured by the network device are respectively carriers 1 to 4. The carrier 1 corresponds to two channels, the carrier 2 corresponds to one channel, the carrier 3 corresponds to two channels, and the carrier 4 corresponds to one channel.

In an example of this implementation, the at least one channel corresponding to each of the M uplink carriers may include a quantity of channels corresponding to each uplink carrier. For example, when the four uplink carriers configured by the network device are respectively the carriers 1 to 4, four bit fields may be used to indicate quantities of channels respectively corresponding to the carriers 1 to 4. For example, the first bit field is used to indicate the quantity of channels corresponding to the carrier 1, the second bit field is used to indicate the quantity of channels corresponding to the carrier 2, the third bit field is used to indicate the quantity of channels corresponding to the carrier 3, and the fourth bit field is used to indicate the quantity of channels corresponding to the carrier 4.

In another example of this implementation, the at least one channel corresponding to each of the M uplink carriers may include an index of a channel corresponding to each uplink carrier. For example, when the four uplink carriers configured by the network device are respectively the carriers 1 to 4, four bit fields may be used to indicate indexes of channels respectively corresponding to the carriers 1 to 4. For example, the first bit field is used to indicate indexes of channels (for example, a channel 1 and a channel 2) corresponding to the carrier 1, the second bit field is used to indicate an index of a channel (for example, a channel 1) corresponding to the carrier 2, the third bit field is used to indicate indexes of channels (for example, a channel 1 and a channel 2) corresponding to the carrier 3, and the fourth bit field is used to indicate an index of a channel (for example, a channel 2) corresponding to the carrier 4.

When the at least one channel corresponding to the uplink carrier is used below, a quantity of channels corresponding to the uplink carrier is used as an example for description.

Step 405: The network device sends information 3 to the terminal device, where the information 3 is used to indicate to activate P uplink carriers.

Correspondingly, in step 406, the terminal device may receive the information 3 sent by the network device, and activate the P uplink carriers.

For example, the P uplink carriers are located in the M uplink carriers configured by the network device for the terminal device, and P is less than or equal to M. Further, P is less than or equal to a maximum quantity of uplink carriers activated by the terminal device.

In an example, the network device may send MAC layer control signaling to the terminal device, and the MAC layer control signaling includes the information 3. For example, the MAC layer control signaling may be a media access control element (MAC CE). Because the MAC CE has HARQ feedback information corresponding to the MAC CE, reliability is relatively high, and it can be ensured that the terminal device receives the information 3.

In another example, the network device may send physical layer control signaling to the terminal device, and the physical layer control signaling includes the information 3. For example, the physical layer control signaling may be downlink control information (DCI). Because the DCI is directly sent by using physical layer information, a latency of receiving the information 3 by the terminal device is relatively low.

In this embodiment of this application, for example, the DCI includes the information 3. A quantity of bits in a bit field that is in the DCI and that is used to carry the information 3 may be related to the maximum quantity of uplink carriers configured for the terminal device or the quantity of uplink carriers configured by the network device for the terminal device. For example, the quantity of bits in the bit field may be $$\left\lceil \log_2\left(\sum_{i=1}^{p1} C_m^i\right) \right\rceil,$$

where m is the maximum quantity of uplink carriers configured for the terminal device or m is the quantity of uplink carriers configured by the network device for the terminal device (that is, m=M), p1 is the maximum quantity of uplink carriers activated by the terminal device, and ⌈ ⌉ indicates a ceiling operation.

For example, M=4, p1=2, and the network device configures carriers 1 to 4 by using RRC signaling. In this case, there are a total of 10 possible activation cases. Therefore, the bit field that is in the DCI and that is used to carry the information 3 may include four bits. If a value of the four bits is 0000, it indicates that an uplink carrier used for uplink transmission is the carrier 1; if a value of the four bits is 0001, it indicates that an uplink carrier used for uplink transmission is the carrier 2; if a value of the four bits is 0100, it indicates that uplink carriers used for uplink transmission are the carriers 1 and 2; and so on. Alternatively, a 4-bit bitmap may be used for indication.

It should be noted that step 405 and step 406 are optional steps. For example, when the network device configures the M uplink carriers for the terminal device, the M uplink carriers are in an active state, or after the terminal device receives the M uplink carriers configured by the network device, the terminal device independently activates the M uplink carriers (that is, the terminal device performs an operation of activating the M uplink carriers). In this case, step 405 and step 406 may not be performed.

Step 407: The network device sends information 4 to the terminal device, where the information 4 indicates an uplink carrier used for uplink transmission.

Correspondingly, in step 408, the terminal device receives the information 4 sent by the network device.

For example, the information 4 may indicate N uplink carriers used for uplink transmission, and the N uplink carriers may be located in the M uplink carriers configured by the network device for the terminal device. Further, the N uplink carriers may be located in the P uplink carriers that the network device indicates the terminal device to activate, and N is less than or equal to P. Further, N is less than or equal to the maximum quantity of uplink carriers supported by the terminal device.

In an example, the network device may send MAC layer control signaling to the terminal device, and the MAC layer control signaling includes the information 3. For example, the MAC layer control signaling may be a MAC CE.

In another example, the network device may send physical layer control signaling to the terminal device, and the physical layer control signaling includes the information 4. For example, the physical layer control signaling may be DCI.

In this embodiment of this application, for example, the DCI includes the information 4. In an example, a quantity of bits in a bit field that is in the DCI and that is used to carry the information 4 may be related to the maximum quantity of uplink carriers configured for the terminal device (or the quantity of uplink carriers configured by the network device for the terminal device). For example, the quantity of bits in the bit field may be $$\left\lceil \log_2\left(\sum_{i=1}^{n1} C_m^i\right) \right\rceil,$$

where m is the maximum quantity of uplink carriers configured for the terminal device or m is the quantity of uplink carriers configured by the network device for the terminal device (that is, m=M), and n1 is the maximum quantity of uplink carriers supported by the terminal device (namely, the maximum quantity of uplink carriers that are simultaneously used for uplink transmission and that are supported by the terminal device). For another example, the quantity of bits in the bit field may be m. In this case, it may be understood that each of the m bits corresponds to one uplink carrier. If a value of the bit is 0, it indicates that the uplink carrier corresponding to the bit is not used for uplink transmission. If a value of the bit is 1, it indicates that the uplink carrier corresponding to the bit may be used for uplink transmission.

In still another example, the quantity of bits in the bit field that is in the DCI and that is used to carry the information 4 may be related to the maximum quantity of uplink carriers activated by the terminal device (or a quantity of uplink carriers that the network device indicates the terminal device to activate). For example, the quantity of bits in the bit field may be $$\left\lceil \log_2\left(\sum_{i=1}^{n1} C_m^i\right) \right\rceil,$$

where p is the maximum quantity of uplink carriers activated by the terminal device, or p is the quantity of uplink carriers that the network device indicates the terminal device to activate (that is, p=P). For still another example, the quantity of bits in the bit field may be p. In this case, it may be understood that each of the p bits corresponds to one uplink carrier.

For example, p1=2, n1=1, and the network device configures carriers 1 to 4 by using RRC signaling. The network device may activate a part of carriers by using a MAC CE, for example, the carriers 1 and 3, and then indicate, by using DCI, the uplink carriers used for uplink transmission, for example, the carrier 1 or 3. In this case, the bit field that is in the DCI and that is used to carry the information 4 may include one bit. If a value of the bit is 1, it indicates that the uplink carrier used for uplink transmission is the carrier 1. If a value of the bit is 0, it indicates that the uplink carrier used for uplink transmission is the carrier 3.

It should be noted that step 407 and step 408 are optional steps. In an example, the uplink carriers that the network device indicates to activate are carriers that can be simultaneously used for uplink transmission (that is, N=P). For example, the network device indicates to activate P carriers, and in this case, the terminal device may perform uplink transmission on the P carriers. In this case, that the information 3 indicates to activate the P uplink carriers may be understood as that the information 3 indicates the P uplink carriers used for uplink transmission.

Step 409: The network device sends information 5 to the terminal device, where the information 5 is used to indicate Q channels, and the Q channels correspond to the N uplink carriers.

Correspondingly, in step 410, the terminal device receives the information 5 sent by the network device.

In this embodiment of this application, the information 5 is used to indicate the Q channels, and there may be two possible cases: a case 1 and a case 2. The two cases are separately explained and described below.

Case 1: The information 5 may explicitly indicate the Q channels. In this case, if the maximum quantity of channels supported by the terminal device is 3, the information 5 may include two bits. For example, if a value of the two bits is 00, it indicates that a quantity of indicated channels is 1; if a value of the two bits is 01, it indicates that a quantity of indicated channels is 2; or if a value of the two bits is 10, it indicates that a quantity of indicated channels is 3. When the quantity of indicated channels is 3, if the N uplink carriers indicated in step 407 include a carrier 1 and a carrier 2, the terminal device may use one channel on the carrier 1, and use two channels on the carrier 2; or use two channels on the carrier 1, and use one channel on the carrier 2. This is not specifically limited.

Case 2: The information 5 may implicitly indicate the Q channels. In this case, the information 5 is used to indicate at least one channel corresponding to each of the N uplink carriers, and a sum of quantities of channels corresponding to each of the N uplink carriers is equal to Q. For example, if the maximum quantity of channels supported by the terminal device is 3, and the N uplink carriers indicated in step 407 include a carrier 1 and a carrier 2, the information 5 may include two bit fields. The first bit field is used to indicate a quantity of channels corresponding to the carrier 1 or an index of a channel corresponding to the carrier 1. The second bit field is used to indicate a quantity of channels corresponding to the carrier 2 or an index of a channel corresponding to the carrier 2. For example, the first bit field and the second bit field are used to indicate the quantity of channels. For example, the first bit field (or the second bit field) includes one bit. When a value of the bit is 0, it indicates that the quantity of indicated channels is 1. When a value of the bit is 1, it indicates that the quantity of indicated channels is 2.

For example, Q is less than or equal to the maximum quantity of channels supported by the terminal device. Q is greater than or equal to N, that is, each of the N uplink carriers corresponds to at least one channel.

For example, the network device may send MAC layer control signaling (for example, a MAC CE) or physical layer control signaling (for example, DCI) to the terminal device, and the MAC layer control signaling or the physical layer control signaling includes the information 5. When the information 5 is sent by using the DCI, if N=1, in a possible case, a quantity of bits in a bit field that is in the DCI and that is used to carry the information 5 may be related to the maximum quantity of channels supported by the terminal device, for example, may be log2e, where e is the maximum quantity of channels supported by the terminal device. In another possible case, the DCI may be the information 5. Because the DCI may be scrambled by using a plurality of possible radio network temporary identifiers (RNTIs), the quantity of channels may be indicated based on different RNTIs used for scrambling. For example, if the DCI is scrambled by using a first RNTI, it indicates that the quantity of channels is 1; if the DCI is scrambled by using a second RNTI, it indicates that the quantity of channels is 2; and so on. The first RNTI may be a cell radio network temporary identifier (C-RNTI), and the second RNTI may be a second cell radio network temporary identifier (SC-RNTI).

It should be noted that: (1) In another possible embodiment, the information 5 sent by the network device to the terminal device in step 409 may be used to indicate the at least one channel corresponding to each of the N uplink carriers. For example, if the maximum quantity of channels supported by the terminal device is 2, and the N uplink carriers indicated in step 407 include a carrier 1 and a carrier 2 (that is, N=2), the information 5 may include two bit fields. The two bit fields are respectively used to indicate a quantity of channels corresponding to the carrier 1 or an index of a channel corresponding to the carrier 1, and a quantity of channels corresponding to the carrier 2 or an index of a channel corresponding to the carrier 2.

(2) Step 409 and step 410 are optional steps. For example, if the quantity of channels corresponding to each of the M uplink carriers is configured for the terminal device in the information 1, step 409 and step 410 may not be performed, and the quantity of channels corresponding to each of the N uplink carriers may be determined based on the quantity of channels corresponding to each of the M uplink carriers configured in the information 1.

Step 411: The terminal device performs uplink transmission with the network device on the Q channels corresponding to the N uplink carriers. In other words, the terminal device performs uplink transmission with the network device on the at least one channel corresponding to each of the N uplink carriers.

For the information 3, the information 4, and the information 5, it should be noted that the information 3, the information 4, and the information 5 may be sent by using a same message, or may be sent by using different messages.

When the information 3 and the information 4 are sent by using a same message, the information 3 and the information 4 may be carried in a same bit field in the DCI. In this case, for example, the network device configures carriers 1 to 4 for the terminal device, the maximum quantity of uplink carriers supported by the terminal device is 1, and the maximum quantity of uplink carriers activated by the terminal device is 1 (which indicates that an activated carrier is the same as a carrier used for uplink transmission). Therefore, the bit field used to carry the information 3 and the information 4 in the DCI may include two bits. When a value of the two bits is 00, it indicates that both the activated carrier and the carrier used for uplink transmission are the carrier 1; when a value of the two bits is 01, it indicates that both the activated carrier and the carrier used for uplink transmission are the carrier 1; and so on. Alternatively, the information 3 and the information 4 may be carried in different bit fields in the DCI. In this case, for a quantity of bits in the bit field that is in the DCI and that is used to carry the information 3, refer to the foregoing related descriptions in step 405 and step 406; and for a quantity of bits in the bit field that is in the DCI and that is used to carry the information 4, refer to the foregoing related descriptions in step 407 and step 408.

When the information 4 and the information 5 are sent by using a same message, the information 4 and the information 5 may be carried in a same bit field or different bit fields in the DCI. An example in which the information 4 and the information 5 may be carried in a same bit field in the DCI is used below for description. In this case, in an example 1, bits in the bit field may indicate, in a joint coding manner, the N uplink carriers used for uplink transmission and the Q channels. For example, the uplink carriers configured by the network device for the terminal device include carriers 1 to 5, the activated uplink carriers include the carriers 1 to 4, the maximum quantity of channels supported by the terminal device is 2, and N=1. In this case, the bit field may include three bits. For example, 000 indicates that the uplink carrier used for uplink transmission is the carrier 1, and a corresponding quantity of channels is 1; 001 indicates that the uplink carrier used for uplink transmission is the carrier 2, and a corresponding quantity of channels is 1; 010 indicates that the uplink carrier used for uplink transmission is the carrier 3, and a corresponding quantity of channels is 1; and so on.

It should be noted that the foregoing describes an implementation in which the joint coding manner described in the example 1 is used when N=1. In another possible embodiment, when N is greater than 1, a plurality of bit fields described in the example 1 may be used for indication. For example, when N=2, two bit fields are used for indication. The first bit field indicates the first carrier used for uplink transmission and a quantity of channels corresponding to the first carrier, and the second bit field indicates the second carrier used for uplink transmission and a quantity of channels corresponding to the second carrier.

Example 2: A part of bits (for example, including a bits) in the bit field may be used to independently indicate the N uplink carriers used for uplink transmission, and the other part of bits (for example, including b bits) may be used to independently indicate the Q channels.

For example, the uplink carriers configured by the network device for the terminal device include carriers 1 to 5, the activated uplink carriers include the carriers 1 to 4, the maximum quantity of channels supported by the terminal device is 3, and N=2. In this case, a may be equal to 3. For example, 000 indicates that the uplink carriers used for uplink transmission are the carrier 1 and the carrier 2; 001 indicates that the uplink carriers used for uplink transmission are the carrier 1 and the carrier 3; and so on. The maximum quantity of channels supported by the terminal device is 3, and there are two uplink carriers used for uplink transmission. Therefore, any uplink carrier used for uplink transmission may correspond to one channel or two channels. It can be learned that b may be equal to 2. The first bit in the b bits is used to indicate a quantity of channels corresponding to a carrier (for example, a carrier with a relatively small number) used for uplink transmission. For example, if a value of the first bit is 0, it indicates that the quantity of channels is 1; or if a value of the first bit is 1, it indicates that the quantity of channels is 2. The second bit in the b bits is used to indicate a quantity of channels corresponding to another carrier (for example, a carrier with a relatively large number) used for uplink transmission. For example, if a value of the a bits is 000, and a value of the b bits is 01, it indicates that the uplink carriers used for uplink transmission are the carrier 1 and the carrier 2, the carrier 1 corresponds to one channel, and the carrier 2 corresponds to two channels.

Mainly based on an example in which the parameters associated with the first uplink capability include the items (1), (2), (3), and (4), an implementation process in which the network device configures the uplink carriers (which is related to the item (1)) for the terminal device, indicates to activate the uplink carriers (which is related to the item (4)), indicates the uplink carriers used for uplink transmission (which is related to the item (2)), and indicates the at least one channel corresponding to each of the carriers used for uplink transmission (which is related to the item (3)) is described above. Further, the network device may reconfigure an uplink carrier for the terminal device, switch an activated uplink carrier, switch an uplink carrier used for uplink transmission, switch a channel corresponding to each of carriers used for uplink transmission, or the like. For example, if the network device reconfigures the uplink carrier for the terminal device, step 403 to step 411 described above may be performed again. For another example, if the network device switches the activated uplink carrier for the terminal device, step 405 to step 411 described above may be performed again. For still another example, if the network device switches, for the terminal device, the uplink carrier used for uplink transmission, step 407 to step 411 described above may be performed again. For another example, if the network device switches, for the terminal device, the uplink carrier used for uplink transmission and the channel corresponding to each of the carriers used for uplink transmission, step 409 to step 411 described above may be performed again.

The following describes a part of possible steps after step 411 with reference to two examples (which are respectively an example 1 and an example 2).

EXAMPLE 1

After step 411, the method may further include step 412*a* to step 416*a*.

Step 412*a*: The network device sends information 4*a* to the terminal device, where the information 4*a* indicates the uplink carrier used for uplink transmission.

Correspondingly, in step 413*a*, the terminal device receives the information 4*a* from the network device.

For example, the information 4*a* indicates N1 uplink carriers used for uplink transmission. In this case, it may be understood that the network device indicates to switch the N uplink carriers used for uplink transmission to the N1 uplink carriers. The N1 uplink carriers are located in the M uplink carriers configured by the network device for the terminal device. Further, the N1 uplink carriers are located in the P uplink carriers that the network device indicates the terminal device to activate, and N1 is less than or equal to P. Further, N1 is less than or equal to the maximum quantity of uplink carriers supported by the terminal device. A value relationship between N1 and N is not limited in this embodiment of this application. For example, N1 may be greater than, less than, or equal to N.

Step 414*a*: The network device sends information 5*a* to the terminal device, where the information 5*a* is used to indicate Q1 channels.

For example, the information 5a is used to indicate a quantity of channels corresponding to each of the N1 uplink carriers, and a sum of quantities of channels corresponding to each of the N1 uplink carriers is Q1.

Correspondingly, in step 415a, the terminal device receives the information 5a from the network device.

Step 416a: The terminal device performs uplink transmission with the network device on the Q1 channels corresponding to the N1 uplink carriers.

In this example, the uplink carriers used for uplink transmission are switched, that is, the N uplink carriers are switched to the N1 uplink carriers. In this embodiment of this application, an occasion for switching the uplink carrier used for uplink transmission may not be limited. In a possible implementation, when uplink transmission cannot be performed on the N uplink carriers, the N uplink carriers may be switched to the N1 uplink carriers, to facilitate uplink transmission.

In this embodiment of this application, it is considered that the terminal device and the network device may communicate with each other in a time division duplex (time division duplexing, TDD) or frequency division duplex (frequency division duplexing, FDD) communication mode. For example, the terminal device communicates with the network device in the TDD communication mode. In an LTE communication system, a length of one radio frame is 10 ms, there are a total of 10 subframes, and each subframe is 1 ms. Further, the 10 subframes include special subframes and normal subframes. The normal subframes are further classified into uplink subframes and downlink subframes. The uplink subframe is used for transmission of uplink control signaling, service data, and the like. The downlink subframe is used for transmission of downlink control signaling, service data, and the like. For example, an uplink-downlink frame configuration may be DSUUUDSUUU, DSUUDD-SUUD, or DSUDDDSUDD, where D represents a downlink subframe, U represents an uplink subframe, and S represents a special subframe. In a 5G communication system, one subframe may include several slots. Therefore, a plurality of uplink-downlink slot configurations are introduced. For example, when one subframe includes 10 slots, an uplink-downlink slot configuration may be simplified and represented as DDDSUDDDSU, DDDDDDDSUU, or DDDDD-SUUUU, where D represents a downlink slot, U represents an uplink slot, and S indicates a special slot.

If the terminal device supports a TDD single carrier, the network device may configure one carrier (for example, a carrier F1) for the terminal device, so that the terminal device can perform uplink transmission only in an uplink slot of the configured carrier F1. For example, an uplink-downlink slot configuration supported by the carrier F1 is DDDSUDDDSU. In this case, in one subframe, the terminal device can perform uplink transmission only in a slot 5 and a slot 10. Consequently, there are a relatively small quantity of uplink transmission opportunities, and uplink transmission performance is affected.

If the terminal device supports an FDD single carrier, the network device may configure one uplink carrier (for example, a carrier F2) and one downlink carrier for the terminal device, so that the terminal device can perform uplink transmission only on the configured carrier F2. In this case, if channel quality of the carrier F2 is relatively poor, an uplink transmission error may be caused, and uplink transmission performance is further affected.

Figure 5C:
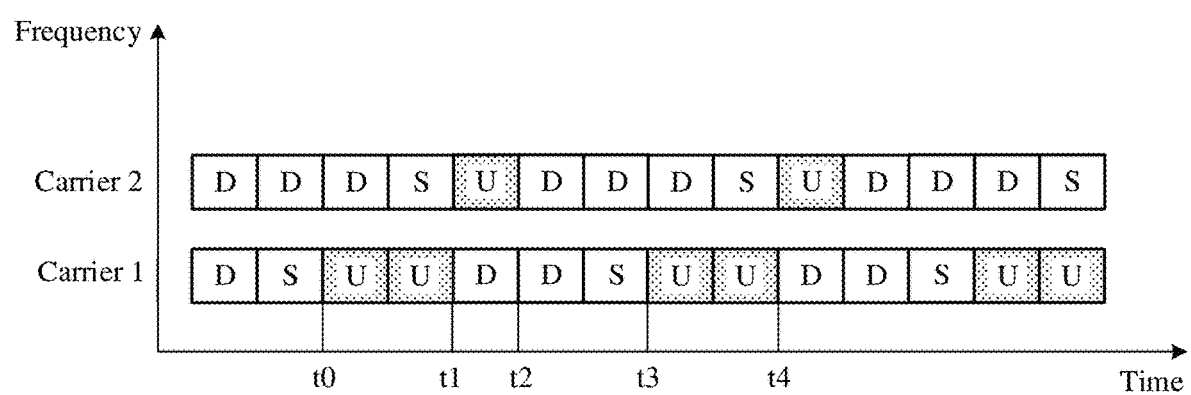
FIG. 5c is a schematic diagram of carrier switching according to an embodiment of this application.

When the foregoing method described in this embodiment of this application is used, in a TDD scenario, for example, as shown in FIG. 5c, if the N (N=1) uplink carriers include a carrier 1, uplink transmission can be performed on the carrier 1 in a time period to t1. In a time period t1 to t2, because uplink transmission cannot be performed on the carrier 1, the N uplink carriers (namely, the carrier 1) may be switched to the N1 uplink carriers (namely, a carrier 2) at the time point t1. Therefore, uplink transmission can be performed in the time period t1 to t2. In a time period t2 to t3, the carrier 2 may be switched to the carrier 1 again, so that uplink transmission is performed in a time period t3 to t4. By analogy, uplink transmission opportunities are greatly increased. In an FDD scenario, for example, if the N (N=1) uplink carriers include a carrier 1, when the terminal device performs uplink transmission on the carrier 1, if the network device determines that channel quality of the carrier 1 is relatively poor, the network device may indicate the terminal device to switch to a carrier 2 with relatively good channel quality to perform uplink transmission. Subsequently, if the network device determines that channel quality of the carrier 2 is relatively poor, the network device may indicate the terminal device to switch to a carrier 3 with relatively good channel quality to perform uplink transmission, and so on. This can effectively avoid an uplink transmission error caused by relatively poor channel quality, and can effectively improve uplink transmission performance.

In this embodiment of this application, the uplink carrier used for uplink transmission may be switched by using the MAC CE or the DCI. Because a transmission latency of the MAC CE or the DCI is lower than that of the RRC signaling, timely switching can be effectively ensured. In addition, because the M uplink carriers configured by the network device for the terminal device are located in a same frequency band combination, switching between different uplink carriers is facilitated.

EXAMPLE 2

After step 411, the method may further include step 412b to step 414b.

Step 412b: The network device sends information 5b to the terminal device, where the information 5b is used to indicate Q2 channels.

Correspondingly, in step 413b, the terminal device receives the information 5b from the network device.

Step 414b: The terminal device performs uplink transmission with the network device on the Q2 channels corresponding to the N uplink carriers.

For example, the information 5b is used to indicate the at least one channel corresponding to each of the N uplink carriers, and a sum of quantities of channels corresponding to each of the N uplink carriers is Q2. It may be understood that the uplink carrier used for uplink transmission is not switched, but a channel corresponding to the uplink carrier used for uplink transmission is switched. In this way, the channel corresponding to the uplink carrier used for uplink transmission is switched, for example, two channels are switched to one channel, so that power consumption of the terminal device can be effectively reduced; for another example, one channel is switched to two channels, so that uplink transmission performance can be effectively improved.

A manner of sending the information 5b by the network device to the terminal device may be similar to the manner of sending the information 5 described above. For example, the information 5b may be sent by using DCI or a MAC CE. When the information 5b is sent by using the DCI, the DCI may include a bit field used to carry the information 5b, and a value of a bit included in the bit field is used to indicate a quantity of channels corresponding to each of the N uplink carriers. Alternatively, the DCI may be the information 5b, and a quantity of channels is indicated based on different RNTIs used for scrambling the DCI.

In addition, if the maximum quantity of channels supported by the terminal device is 2, and the network device indicates that the quantity of uplink carriers used for uplink transmission is 1, in another possible manner, the bit field that is in the DCI and that is used to indicate the quantity of channels includes one bit, and whether to switch from the Q channels to the Q2 channels may be determined based on whether the value of the bit in two adjacent pieces of DCI changes. For example, when performing uplink transmission on one channel, if a value of a bit field in DCI-1 received by the terminal device is 0, and then a value of a bit field DCI-2 received by the terminal device is 1, the terminal device may perform channel switching, that is, perform uplink transmission on two channels. Subsequently, if a value of a bit field in DCI-3 received by the terminal device is 0, the terminal device may perform channel switching again, that is, perform uplink transmission on one channel.

Based on the descriptions of this embodiment of this application in Embodiment 1, two possible implementation procedures are described below with reference to Embodiment 2 and Embodiment 3.

Embodiment 2

Figure 5D:
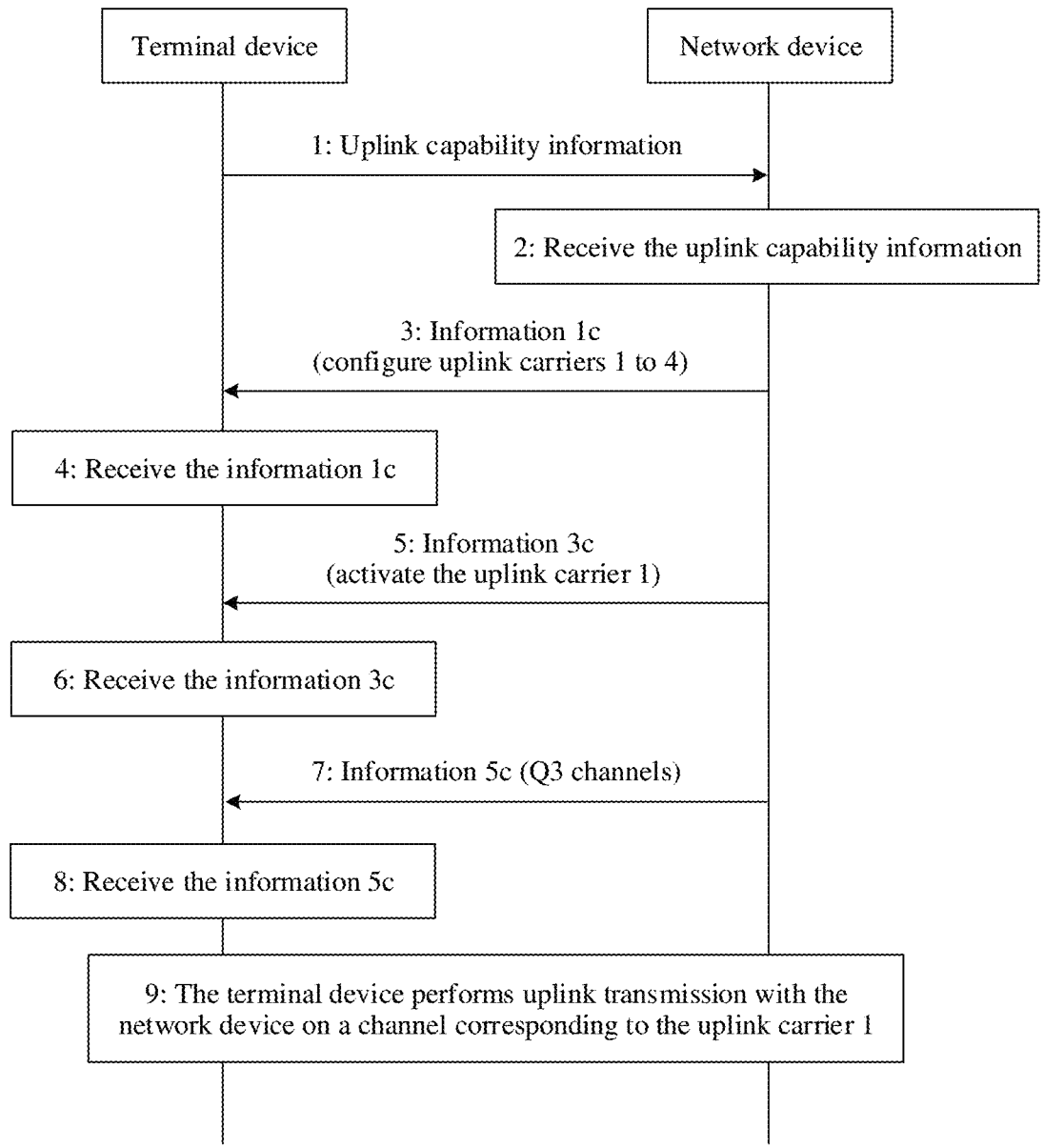
FIG. 5d is a schematic flowchart corresponding to a communication method according to Embodiment 2 of this application.

FIG. 5d is a schematic flowchart corresponding to a communication method according to Embodiment 2 of this application. As shown in FIG. 5d, the method includes the following steps.

Step 1: A terminal device sends uplink capability information to a network device, where the uplink capability information includes a maximum quantity of uplink carriers configured for the terminal device, a maximum quantity of uplink carriers activated by the terminal device, and a maximum quantity of channels supported by the terminal device. The maximum quantity of uplink carriers activated by the terminal device is 1, and the maximum quantity of uplink carriers activated by the terminal device may be understood as a maximum quantity of carriers supported by the terminal device.

Correspondingly, in step 2, the network device receives the uplink capability information sent by the terminal device.

Step 3: The network device may send information 1c to the terminal device based on the uplink capability information, where the information 1c is used to configure M uplink carriers for the terminal device. For example, the M uplink carriers include uplink carriers 1 to 4.

Correspondingly, in step 4, the terminal device receives the information 1c sent by the network device.

For example, the information 1c may be further used to configure, for the terminal device, at least one channel corresponding to each of the M uplink carriers.

Step 5: The network device sends information 3c to the terminal device, where the information 3c is used to indicate to activate one of the uplink carriers 1 to 4 (for example, the uplink carrier 1).

Correspondingly, in step 6, the terminal device may receive the information 3c sent by the network device, and activate the uplink carrier 1.

The information 3c is used to indicate to activate the uplink carrier 1, or it may be understood that the information 3c is used to indicate to perform uplink transmission on the uplink carrier 1.

Step 7: The network device sends information 5c to the terminal device, where the information 5c is used to indicate Q3 channels, and the Q3 channels correspond to the uplink carrier 1. For example, Q3=1.

Correspondingly, in step 8, the terminal device receives the information 5c sent by the network device.

Step 9: The terminal device performs uplink transmission with the network device on the channel corresponding to the uplink carrier 1.

It should be noted that if the information 1c in step 3 is further used to configure, for the terminal device, the at least one channel corresponding to each of the M uplink carriers, step 7 and step 8 may not be performed herein. The terminal device may learn, based on the information 1c, of the channel corresponding to the uplink carrier 1, and perform uplink transmission with the network device on the channel corresponding to the uplink carrier 1.

Further, after step 9, the network device may switch the activated uplink carrier from the uplink carrier 1 to the uplink carrier 2. For details, refer to the descriptions in Embodiment 1. Details are not described herein again.

According to the foregoing method, the maximum quantity of uplink carriers activated by the terminal device is 1. In other words, the terminal device can perform uplink transmission on only one uplink carrier at a same moment. However, because the network device configures a plurality of uplink carriers for the terminal device, the network device may switch, based on an actual requirement, an uplink carrier used for uplink transmission. Compared with single-carrier switching in a conventional technology, in this embodiment of this application, a solution of switching a carrier used for uplink transmission is more flexible and a latency is relatively low, so that uplink transmission performance can be effectively improved.

Embodiment 3

Figure 5E:
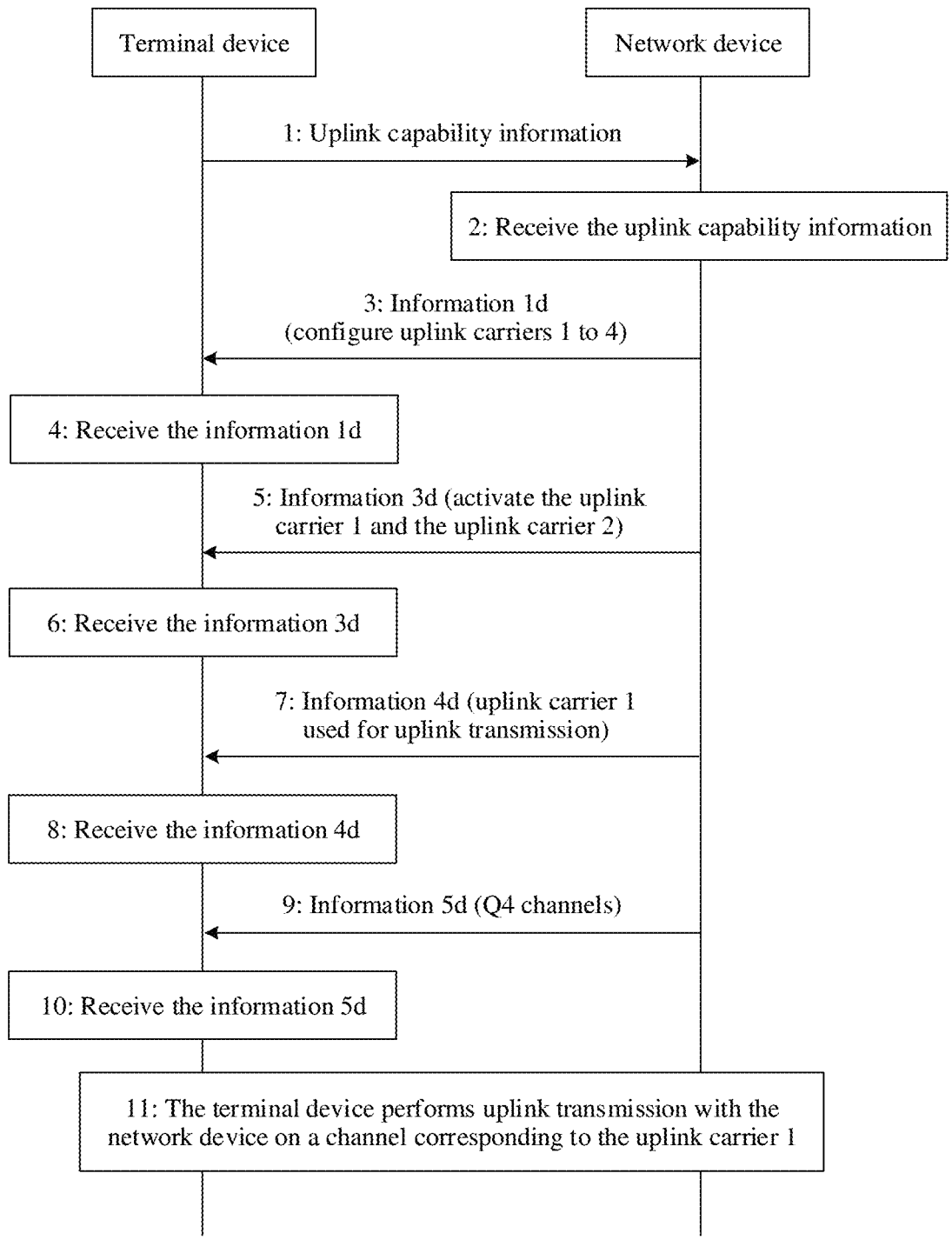
FIG. 5e is a schematic flowchart corresponding to a communication method according to Embodiment 3 of this application.

FIG. 5e is a schematic flowchart corresponding to a communication method according to Embodiment 3 of this application. As shown in FIG. 5e, the method includes the following steps.

Step 1: A terminal device sends uplink capability information to a network device, where the uplink capability information includes a maximum quantity of uplink carriers configured for the terminal device, a maximum quantity of uplink carriers activated by the terminal device, a maximum quantity of uplink carriers supported by the terminal device, and a maximum quantity of channels supported by the terminal device. The maximum quantity of uplink carriers supported by the terminal device is 1.

Correspondingly, in step 2, the network device receives the uplink capability information sent by the terminal device.

Step 3: The network device may send information id to the terminal device based on the uplink capability information, where the information id is used to configure M uplink carriers for the terminal device. For example, the M uplink carriers include uplink carriers 1 to 4.

For example, the information 1d may be further used to configure, for the terminal device, at least one channel corresponding to each of the M uplink carriers. For example, the carrier 1 corresponds to one channel, the carrier 2 corresponds to two channels, the carrier 3 corresponds to one channel, and the carrier 4 corresponds to two channels.

Correspondingly, in step 4, the terminal device receives the information 1d sent by the network device.

Step 5: The network device sends information 3d to the terminal device, where the information 3d is used to indicate to activate P uplink carriers (for example, activate the uplink carrier 1 and the uplink carrier 2).

Correspondingly, in step 6, the terminal device may receive the information 3d sent by the network device, and activate the uplink carrier 1 and the uplink carrier 2.

Step 7: The network device sends information 4d to the terminal device, where the information 4d indicates an uplink carrier used for uplink transmission. For example, the uplink carrier that is used for uplink transmission and that is indicated by the information 4d is the uplink carrier 1.

Correspondingly, in step 8, the terminal device receives the information 4d sent by the network device.

Step 9: The network device sends information 5d to the terminal device, where the information 5d is used to indicate Q4 channels, and the Q4 channels correspond to the uplink carrier 1. For example, Q4=1.

Correspondingly, in step 10, the terminal device receives the information 5d sent by the network device.

Step 11: The terminal device performs uplink transmission with the network device on the channel corresponding to the uplink carrier 1.

It should be noted that if the information id in step 3 is further used to configure, for the terminal device, the at least one channel corresponding to each of the M uplink carriers, step 9 and step 10 may not be performed herein. The terminal device may learn, based on the information id, of the channel corresponding to the uplink carrier 1, and perform uplink transmission with the network device on the channel corresponding to the uplink carrier 1.

For example, the terminal device may learn, based on the information id described above, that a quantity of channels corresponding to the uplink carrier 1 is 1. In this way, the terminal device may select one channel from channels of the terminal device as the channel corresponding to the uplink carrier 1, and perform uplink transmission with the network device on the channel.

Further, after step 11, the network device may switch the uplink carrier used for uplink transmission from the uplink carrier 1 to the uplink carrier 2. After the uplink carrier is switched to the uplink carrier 2, the terminal device may learn, based on the information id described above, that a quantity of channels corresponding to the uplink carrier 2 is 2. In this way, the terminal device may select two channels from the channels of the terminal device as channels corresponding to the uplink carrier 2, and perform uplink transmission with the network device on the selected channels. For details, refer to the descriptions in Embodiment 1. Details are not described herein again.

According to the foregoing method, the maximum quantity of uplink carriers supported by the terminal device is 1. In other words, the terminal device can perform uplink transmission on only one uplink carrier at a same moment. However, because the network device configures a plurality of uplink carriers for the terminal device, and indicates to activate at least one uplink carrier, if a quantity of activated carriers is greater than 1, the network device may switch, based on an actual requirement, an uplink carrier used for uplink transmission. Compared with single-carrier switching in the conventional technology, in this embodiment of this application, a solution of switching a carrier used for uplink transmission is more flexible and a latency is relatively low, so that uplink transmission performance can be effectively improved.

For Embodiment 1, Embodiment 2, and Embodiment 3, it should be noted that: (1) Step numbers in FIG. 4A and FIG. 4B, FIG. 5d, and FIG. 5e are merely examples of execution procedures, and do not constitute a limitation on an execution sequence of the steps. In the embodiments of this application, there is no strict execution sequence between steps that have no time sequence dependency relationship with each other. (2) A difference between Embodiment 1, Embodiment 2, and Embodiment 3 is as follows: In Embodiment 1, the terminal device can perform uplink transmission on one or more uplink carriers at a same moment. However, in Embodiment 2 and Embodiment 3, the terminal device can perform uplink transmission on only one uplink carrier at a same moment. For content other than this difference, mutual reference may be made between Embodiment 1, Embodiment 2, and Embodiment 3

The foregoing mainly describes the solutions provided in the embodiments of this application from a perspective of interaction between the network device and the terminal device. It may be understood that, to implement the foregoing functions, the network device or the terminal device may include a corresponding hardware structure and/or a software module for performing each function. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, division into functional units may be performed on the terminal device and the network device based on the foregoing method examples. For example, division into each functional unit may be based on each corresponding function, or two or more functions may be integrated into one unit. The integrated unit may be implemented in a form of hardware, or may be implemented in a form of a software functional unit.

Figure 6:
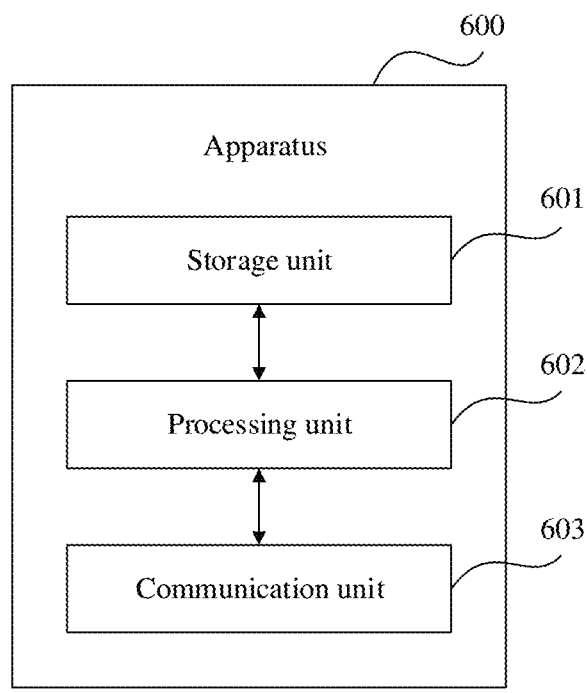
FIG. 6 is a possible example block diagram of an apparatus according to an embodiment of this application.

When an integrated unit is used, FIG. 6 is a possible example block diagram of an apparatus according to an embodiment of this application. As shown in FIG. 6, the apparatus 600 may include a processing unit 602 and a communication unit 603. The processing unit 602 is configured to control and manage an action of the apparatus 600. The communication unit 603 is configured to support the apparatus 600 to communicate with another device. Optionally, the communication unit 603 is also referred to as a transceiver unit, and may include a receiving unit and/or a sending unit, which are respectively configured to perform a receiving operation and a sending operation. The apparatus 600 may further include a storage unit 601, configured to store program code and/or data of the apparatus 600.

The apparatus 600 may be the terminal device in the foregoing embodiments, or may be a chip disposed in the terminal device. The processing unit 602 may support the apparatus 600 to perform an action of the terminal device in the foregoing method examples. Alternatively, the processing unit 602 mainly performs an internal action of the terminal device in the method examples, and the communication unit 603 may support communication between the apparatus 600 and a network device. For example, the communication unit 603 may be configured to perform step 401, step 404, step 406, step 408, step 410, step 411, step 413a, step 415a, step 416a, step 413b, and step 414b in FIG. 4A and FIG. 4B.

Specifically, in an embodiment, the communication unit 603 is configured to: send uplink capability information to the network device, where the uplink capability information includes at least one of the following: a maximum quantity of uplink carriers configured for the communication apparatus, a maximum quantity of uplink carriers supported by the communication apparatus, and a maximum quantity of channels supported by the communication apparatus; and receive first information from the network device, where the first information indicates an uplink carrier used for uplink transmission, and performs uplink transmission with the network device on the uplink carrier.

In a possible design, when the uplink capability information includes the maximum quantity of uplink carriers configured for the communication apparatus and the maximum quantity of uplink carriers supported by the communication apparatus, the first information indicates N uplink carriers used for uplink transmission, and the N uplink carriers are located in M uplink carriers configured for the communication apparatus; and the communication unit 603 is specifically configured to perform uplink transmission with the network device on the N uplink carriers, where M is an integer greater than 1, N is an integer greater than or equal to 1, and N≤M; and M is less than or equal to the maximum quantity of uplink carriers configured for the communication apparatus, and N is less than or equal to the maximum quantity of uplink carriers supported by the communication apparatus.

In a possible design, when the uplink capability information further includes the maximum quantity of channels supported by the communication apparatus, the communication unit 603 is further configured to: receive second information from the network device, where the second information indicates Q channels, and the Q channels correspond to the N uplink carriers; and the performing uplink transmission with the network device on the uplink carrier includes: performing uplink transmission with the network device on the Q channels corresponding to the N uplink carriers, where Q is less than or equal to the maximum quantity of channels supported by the communication apparatus.

In a possible design, the communication unit 603 is further configured to receive third information from the network device, where the third information is used to configure, for the communication apparatus, the M uplink carriers and at least one channel corresponding to each of the M uplink carriers, where a sum of quantities of channels corresponding to each of the M uplink carriers is less than or equal to the maximum quantity of channels supported by the communication apparatus.

In a possible design, the uplink carrier used for uplink transmission is located in a frequency range covered by a first frequency band combination, and the first frequency band combination includes at least one frequency band. For example, the M uplink carriers may alternatively be located in the frequency range covered by the first frequency band combination.

In a possible design, the communication unit 603 is further configured to send fourth information to the network device, where the fourth information is used to indicate at least one frequency band combination supported by the communication apparatus, and the at least one frequency band combination includes the first frequency band combination.

The apparatus 600 may be the network device in the foregoing embodiments, or may be a chip disposed in the network device. The processing unit 602 may support the apparatus 600 to perform an action of the network device in the foregoing method examples. Alternatively, the processing unit 602 mainly performs an internal action of the network device in the method examples, and the communication unit 603 may support communication between the apparatus 600 and a terminal device. For example, the communication unit 603 may be configured to perform step 402, step 403, step 405, step 407, step 409, step 411, step 412a, step 414a, step 416a, step 412b, and step 414b in FIG. 4A and FIG. 4B.

Specifically, in an embodiment, the communication unit 603 is configured to receive uplink capability information from the terminal device, where the uplink capability information includes at least one of the following: a maximum quantity of uplink carriers configured for the terminal device, a maximum quantity of uplink carriers supported by the terminal device, and a maximum quantity of channels supported by the terminal device. Further, the communication unit 603 is configured to send first information to the terminal device, where the first information indicates an uplink carrier used for uplink transmission, and perform uplink transmission with the terminal device on the uplink carrier.

In a possible design, when the uplink capability information includes the maximum quantity of uplink carriers configured for the terminal device and the maximum quantity of uplink carriers supported by the terminal device, the first information indicates N uplink carriers used for uplink transmission, and the N uplink carriers are located in M uplink carriers configured for the terminal device; and the communication unit 603 is specifically configured to perform uplink transmission with the terminal device on the N uplink carriers, where M is an integer greater than 1, N is an integer greater than or equal to 1, and N≤M; and M is less than or equal to the maximum quantity of uplink carriers configured for the terminal device, and N is less than or equal to the maximum quantity of uplink carriers supported by the terminal device.

In a possible design, when the uplink capability information further includes the maximum quantity of channels supported by the terminal device, the communication unit 603 is further configured to: send second information to the terminal device, where the second information indicates Q channels, and the Q channels correspond to the N uplink carriers; and the performing uplink transmission with the terminal device on the uplink carrier includes: performing uplink transmission with the terminal device on the Q channels corresponding to the N uplink carriers, where Q is less than or equal to the maximum quantity of channels supported by the terminal device.

In a possible design, the communication unit 603 is further configured to send third information to the terminal device, where the third information is used to configure, for the terminal device, the M uplink carriers and at least one channel corresponding to each of the M uplink carriers, where a sum of quantities of channels corresponding to each of the M uplink carriers is less than or equal to the maximum quantity of channels supported by the terminal device.

In a possible design, the uplink carrier used for uplink transmission is located in a frequency range covered by a first frequency band combination, and the first frequency band combination includes at least one frequency band.

In a possible design, the communication unit 603 is further configured to receive fourth information from the terminal device, where the fourth information is used to indicate at least one frequency band combination supported by the terminal device, and the at least one frequency band combination includes the first frequency band combination.

It should be noted that, in the embodiments of this application, division into units (modules) is an example, and is merely logical function divisions. During actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium may be any medium that can store program code, such as a memory.

Figure 7:
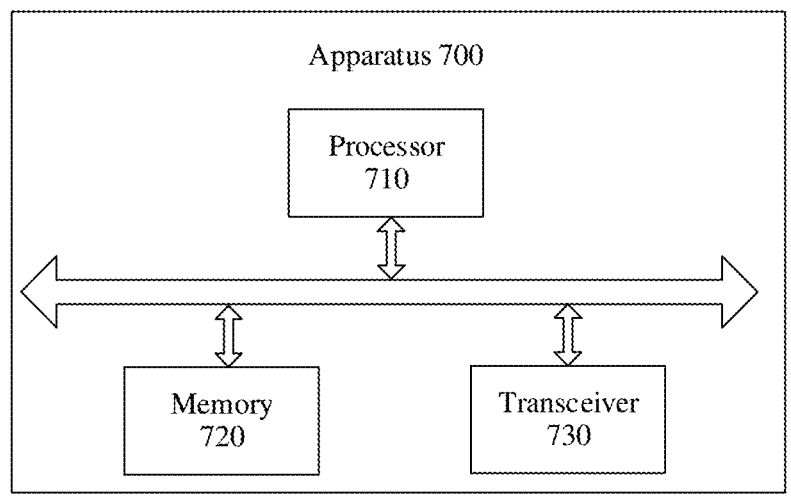
FIG. 7 is a schematic diagram of a structure of an apparatus according to an embodiment of this application.

FIG. 7 is a schematic diagram of a structure of an apparatus. The apparatus 700 includes a processor 710, a memory 720, and a transceiver 730. In an example, the apparatus 700 may implement functions of the apparatus 600 shown in FIG. 6. Specifically, the transceiver may implement the function of the communication unit 603 shown in FIG. 6, the processor may implement the function of the processing unit 602, and the memory may implement the function of the storage unit 601. In another example, the apparatus 700 may be the terminal device in the foregoing method embodiments. The apparatus 700 may be configured to implement the method that corresponds to the terminal device and that is described in the foregoing method embodiments. For details, refer to the descriptions in the foregoing method embodiments.

Figure 8:
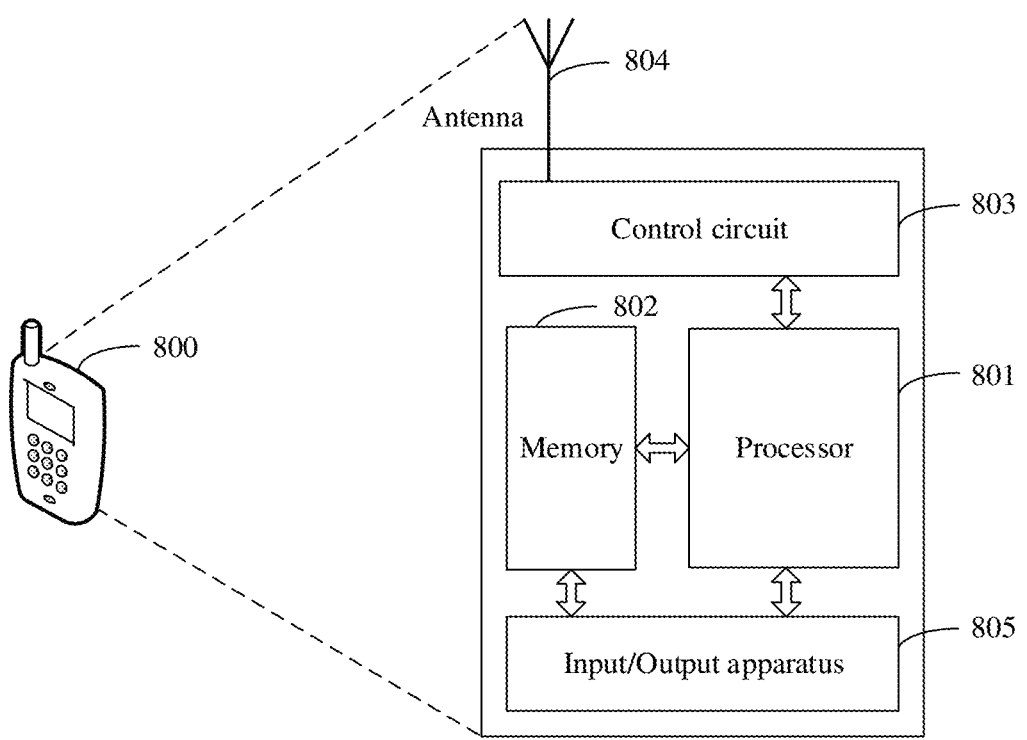
FIG. 8 is a schematic diagram of a structure of a terminal device according to an embodiment of this application.

FIG. 8 is a schematic diagram of a structure of a terminal device 800 according to an embodiment of this application. For ease of description, FIG. 8 shows only main components of the terminal device. As shown in FIG. 8, the terminal device 800 includes a processor 801, a memory 802, a control circuit 803, an antenna 804, and an input/output apparatus 805. The terminal device 800 may be used in the system architecture shown in FIG. 1, FIG. 2, or FIG. 3, to perform functions of the terminal device in the foregoing method embodiments.

The processor 801 is mainly configured to: process a communication protocol and communication data, control the entire terminal device, execute a software program, and process data of the software program, for example, configured to control the terminal device in performing the actions described in the foregoing method embodiments. The memory 802 is mainly configured to store the software program and the data. The control circuit 803 is mainly configured to: perform conversion between a baseband signal and a radio frequency signal, and process the radio frequency signal. The control circuit 803 and the antenna 804 together may also be referred to as a transceiver that is mainly configured to receive and send a radio frequency signal in a form of an electromagnetic wave. The input/output apparatus 805, such as a touchscreen, a display screen, or a keyboard, is mainly configured to: receive data entered by a user, and output data to the user.

After the terminal device is powered on, the processor 801 may read the software program in the memory 802, explain and execute instructions of the software program, and process the data of the software program. When data needs to be sent in a wireless manner, the processor 801 performs baseband processing on the to-be-sent data, and then outputs a baseband signal to a radio frequency circuit. The radio frequency circuit performs radio frequency processing on the baseband signal, and then sends a radio frequency signal through the antenna 804 in a form of an electromagnetic wave. When data is sent to the terminal device, the radio frequency circuit receives the radio frequency signal through the antenna, converts the radio frequency signal into a baseband signal, and outputs the baseband signal to the processor 801. The processor 801 converts the baseband signal into data, and processes the data.

A person skilled in the art may understand that, for ease of description, FIG. 8 shows only one memory 802 and one processor 801. In an actual terminal device, there may be a plurality of processors 801 and memories 802. The memory 802 may also be referred to as a storage medium, a storage device, or the like. This is not limited in the embodiments of this application.

In an optional implementation, the processor 801 may include a baseband processor and a central processing unit. The baseband processor is mainly configured to process the communication protocol and the communication data. The central processing unit is mainly configured to: control the entire terminal device, execute the software program, and process the data of the software program. The processor 801 in FIG. 8 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor 801, or may be stored in the memory 802 in a form of a software program. The processor 801 executes the software program to implement a baseband processing function.

The terminal device 800 shown in FIG. 8 can implement processes related to the terminal device in the method embodiment shown in FIG. 4A and FIG. 4B. Operations and/or functions of the modules in the terminal device 800 are separately intended to implement corresponding procedures in the foregoing method embodiments. For details, refer to the descriptions in the foregoing method embodiments. To avoid repetition, detailed descriptions are properly omitted herein.

Figure 9:
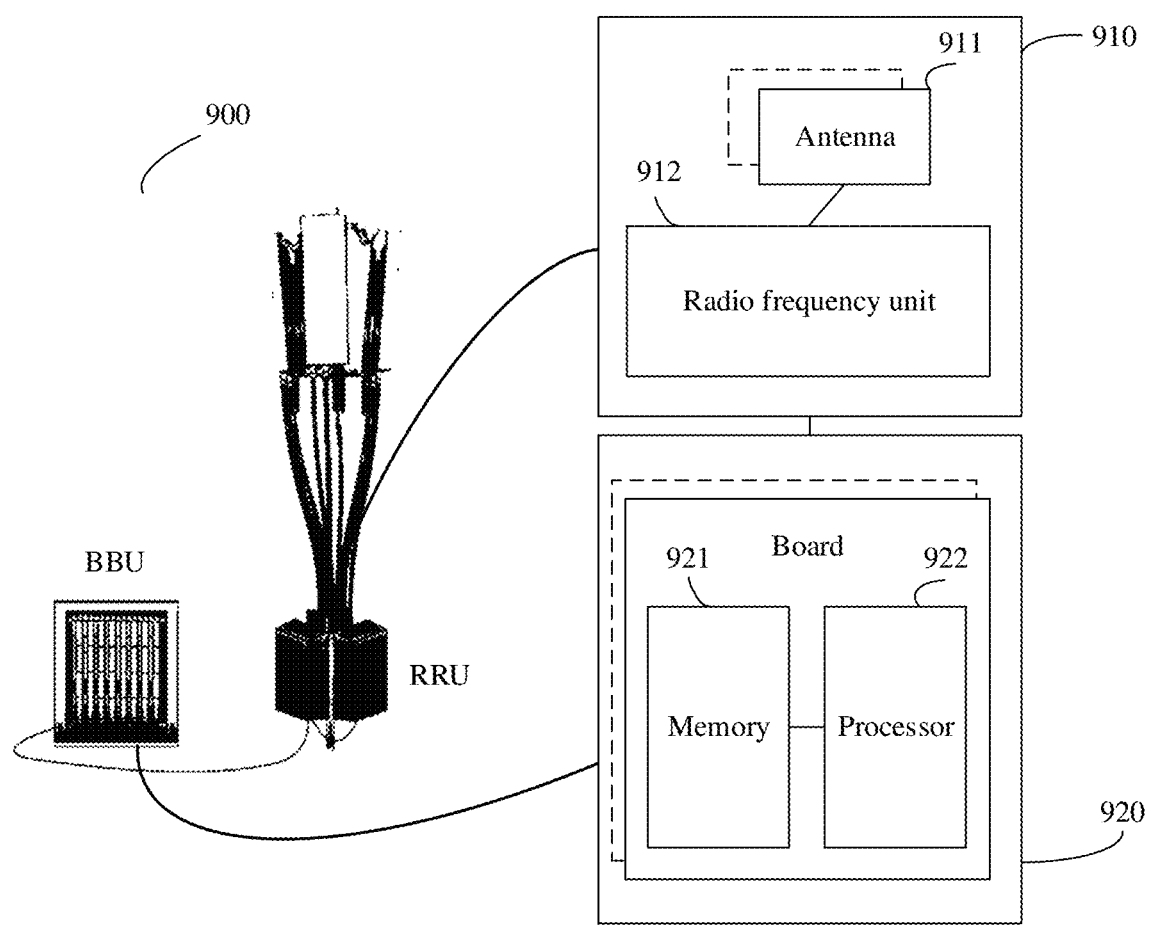
FIG. 9 is a schematic diagram of a structure of a network device according to an embodiment of this application.

FIG. 9 is a schematic diagram of a structure of a network device 900 according to an embodiment of this application. As shown in FIG. 9, the network device 900 includes one or more radio frequency units, for example, a remote radio unit (RRU) 910 and one or more baseband units (BBUs) 920. The RRU 910 may be referred to as a communication unit, and corresponds to the communication unit 603 in FIG. 6. Optionally, the communication unit may also be referred to as a transceiver machine, a transceiver circuit, a transceiver, or the like, and may include at least one antenna 911 and a radio frequency unit 912. The RRU 910 is mainly configured to: receive and send a radio frequency signal, and perform conversion between a radio frequency signal and a baseband signal. For example, the RRU 910 is configured to send information 1 to a terminal device. The BBU 920 is mainly configured to: perform baseband processing, control a base station, and the like. The RRU 910 and the BBU 920 may be physically disposed together, or may be physically disposed separately, namely, a distributed base station.

The BBU 920 is a control center of the base station, and may also be referred to as a processing module. The BBU 920 may correspond to the processing unit 602 in FIG. 6, and is mainly configured to implement a baseband processing function, for example, channel coding, multiplexing, modulation, or spreading. For example, the BBU (the processing module) may be configured to control the base station to perform an operation procedure related to the network device in the foregoing method embodiments, for example, generate the information 1.

In an example, the BBU 920 may include one or more boards, and a plurality of boards may jointly support a radio access network (for example, an LTE network) in a single access standard, or may separately support radio access networks (for example, an LTE network, a 5G network, and another network) in different access standards. The BBU 920 further includes a memory 921 and a processor 922. The memory 921 is configured to store necessary instructions and data. The processor 922 is configured to control the base station to perform necessary actions, for example, configured to control the base station to perform an operation procedure related to the network device in the foregoing method embodiments. The memory 921 and the processor 922 may serve one or more boards. In other words, the memory and the processor may be disposed on each board. Alternatively, a plurality of boards may share a same memory and a same processor. In addition, a necessary circuit may be further disposed on each board.

The network device 900 shown in FIG. 9 can implement processes related to the network device in the method embodiment shown in FIG. 4A and FIG. 4B. Operations and/or functions of the modules in the network device 900 are separately intended to implement corresponding procedures in the foregoing method embodiments. For details, refer to the descriptions in the foregoing method embodiments. To avoid repetition, detailed descriptions are properly omitted herein.

In an implementation process, the steps of the methods in the embodiments can be implemented through a hardware integrated logic circuit in the processor, or by using instructions in a form of software. The steps of the methods disclosed with reference to the embodiments of this application may be directly performed by a hardware processor, or may be performed by using a combination of hardware in the processor and a software module.

It should be noted that the processor in embodiments of this application may be an integrated circuit chip, and has a signal processing capability. In an implementation process, steps in the foregoing method embodiments can be implemented through a hardware integrated logic circuit in the processor, or by using instructions in a form of software. The processor may be a general-purpose central processing unit (CPU), a general-purpose processor, digital signal processing (DSP), an application-specific integrated circuit (ASIC), a field programmable gate array (FPGA) or another programmable logic device, a transistor logic device, a hardware component, or any combination thereof. Alternatively, the processor may be a combination of processors implementing a computing function, for example, a combination of one or more microprocessors or a combination of a DSP and a microprocessor. The general-purpose processor may be a microprocessor, or the processor may be any conventional processor or the like.

It may be understood that the memory or storage unit in the embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the systems and methods described in this specification includes but is not limited to these memories and any memory of another proper type.

All or some of the foregoing embodiments may be implemented by software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, all or some of the procedures or functions in the embodiments of this application are performed. The computer may be a general-purpose computer, a dedicated computer, a computer network, or another programmable apparatus. The computer programs or the instructions may be stored in a computer-readable storage medium, or may be transmitted through the computer-readable storage medium. The computer-readable storage medium may be any usable medium accessible by a computer, or a data storage device, such as a server integrating one or more usable media. The usable medium may be a magnetic medium, for example, a floppy disk, a hard disk drive, or a magnetic tape, may be an optical medium, for example, a DVD, or may be a semiconductor medium, for example, a solid-state drive (solid state disk, SSD).

The various illustrative logical units and circuits described in embodiments of this application may implement or operate the described functions through a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although the embodiments of this application are described with reference to specific features, it is clear that various modifications and combinations may be made to them without departing from the spirit and scope of the embodiments of this application. Correspondingly, the specification and accompanying drawings are merely example descriptions of the embodiments of this application that are defined by the appended claims, and are considered as any of or all modifications, variations, combinations or equivalents that cover the scope of this application.

What is claimed is:

1. A communication method, wherein the method comprises:
sending uplink capability information of an communication apparatus to a network device, wherein the uplink capability information comprises: a maximum quantity of uplink carriers configured for the communication apparatus, and a maximum quantity of uplink carriers supported by the communication apparatus;
receiving first information from the network device in response to sending the uplink capability information, wherein the first information indicates N uplink carriers to be used for uplink transmission of the communication apparatus, and the N uplink carriers belong to M uplink carriers configured for the communication apparatus; and
performing the uplink transmission with the network device on the N uplink carriers;
wherein M is an integer greater than 1, N is an integer greater than or equal to 1, and N≤M; and
wherein M is less than or equal to the maximum quantity of uplink carriers configured for the communication apparatus, and N is less than or equal to the maximum quantity of uplink carriers supported by the communication apparatus.

2. The method according to claim 1, wherein the uplink capability information further comprises a maximum quantity of channels supported by the communication apparatus, and the method further comprises:
receiving second information from the network device, wherein the second information indicates Q channels, and the Q channels correspond to the N uplink carriers; and
wherein performing the uplink transmission with the network device on the N uplink carriers comprises: performing the uplink transmission with the network device on the Q channels corresponding to the N uplink carriers, wherein
Q is less than or equal to the maximum quantity of channels supported by the communication apparatus.

3. The method according to claim 1, wherein the method further comprises:
receiving third information from the network device, wherein the third information configures, for the communication apparatus, the M uplink carriers and at least one channel corresponding to each of the M uplink carriers, wherein
a sum of quantities of channels corresponding to each of the M uplink carriers is less than or equal to a maximum quantity of channels supported by the communication apparatus.

4. The method according to claim 1, wherein a first uplink carrier of the N uplink carriers to be used for the uplink transmission is located in a frequency range covered by a first frequency band combination, and the first frequency band combination comprises at least one frequency band.

5. The method according to claim 4, wherein the method further comprises:
sending fourth information to the network device, wherein the fourth information indicates at least one frequency band combination supported by the communication apparatus, and the at least one frequency band combination comprises the first frequency band combination.

6. A communication method, wherein the method comprises:
receiving uplink capability information from a terminal device, wherein the uplink capability information comprises: a maximum quantity of uplink carriers configured for the terminal device and a maximum quantity of uplink carriers supported by the terminal device;
sending first information to the terminal device in response to receiving the uplink capability information, wherein the first information indicates N uplink carriers to be used for uplink transmission of the terminal device, and the N uplink carriers belong to M uplink carriers configured for the terminal device; and
performing the uplink transmission with the terminal device on the N uplink carriers; and wherein M is an integer greater than 1, N is an integer greater than or equal to 1, N≤M, M is less than or equal to the maximum quantity of uplink carriers configured for the terminal device, and N is less than or equal to the maximum quantity of uplink carriers supported by the terminal device.

7. The method according to claim 6, wherein the uplink capability information further comprises a maximum quantity of channels supported by the terminal device, and the method further comprises:
sending second information to the terminal device, wherein the second information indicates Q channels, and the Q channels correspond to the N uplink carriers; and
wherein performing the uplink transmission with the terminal device on the N uplink carriers comprises: performing the uplink transmission with the terminal device on the Q channels corresponding to the N uplink carriers, wherein
Q is less than or equal to the maximum quantity of channels supported by the terminal device.

8. The method according to claim 6, wherein the method further comprises:
sending third information to the terminal device, wherein the third information configures, for the terminal device, the M uplink carriers and at least one channel corresponding to each of the M uplink carriers, wherein
a sum of quantities of channels corresponding to each of the M uplink carriers is less than or equal to a maximum quantity of channels supported by the terminal device.

9. A communication apparatus comprising:
a transmitter configured to send uplink capability information of the communication apparatus to a network device, wherein the uplink capability information comprises: a maximum quantity of uplink carriers configured for the communication apparatus, and a maximum quantity of uplink carriers supported by the communication apparatus;
a receiver configured to receive first information from the network device in response to sending the uplink capability information, wherein the first information indicates N uplink carriers to be used for uplink transmission of the communication apparatus, and the N uplink carriers belong to M uplink carriers configured for the communication apparatus; and
the transmitter further configured to perform the uplink transmission with the network device on the N uplink carriers; and
wherein M is an integer greater than 1, N is an integer greater than or equal to 1, N≤ M, M is less than or equal to the maximum quantity of uplink carriers configured for the communication apparatus, and N is less than or equal to the maximum quantity of uplink carriers supported by the communication apparatus.

10. The communication apparatus according to claim 9, wherein the uplink capability information further comprises a maximum quantity of channels supported by the communication apparatus, and the receiver is further configured to receive second information from the network device, wherein the second information indicates Q channels, and the Q channels correspond to the N uplink carriers; and
wherein performing the uplink transmission with the network device on the N uplink carriers comprises: performing the uplink transmission with the network device on the Q channels corresponding to the N uplink carriers, wherein
Q is less than or equal to a maximum quantity of channels supported by the communication apparatus.

11. The communication apparatus according to claim 9, wherein the receiver is further configured to receive third information from the network device, wherein the third information configures, for the communication apparatus, the M uplink carriers and at least one channel corresponding to each of the M uplink carriers, wherein
a sum of quantities of channels corresponding to each of the M uplink carriers is less than or equal to a maximum quantity of channels supported by the communication apparatus.

12. The communication apparatus according to claim 9, wherein
a first uplink carrier of the N uplink carriers to be used for the uplink transmission is located in a frequency range covered by a first frequency band combination, and the first frequency band combination comprises at least one frequency band.

13. The communication apparatus according to claim 12, wherein the transmitter is further configured to send fourth information to the network device, wherein the fourth information indicates at least one frequency band combination supported by the communication apparatus, and the at least one frequency band combination comprises the first frequency band combination.

14. A communication apparatus comprising:
a receiver configured to receive uplink capability information from a terminal device, wherein the uplink capability information comprises: a maximum quantity of uplink carriers configured for the terminal device, and a maximum quantity of uplink carriers supported by the terminal device;
a transmitter configured to send first information to the terminal device in response to receipt of the uplink capability information, wherein the first information indicates N uplink carriers to be used for uplink transmission of the terminal device, and the N uplink carriers belong to M uplink carriers configured for the terminal device; and
the receiver is further configured to perform the uplink transmission with the terminal device on the uplink carrier; and
wherein M is an integer greater than 1, N is an integer greater than or equal to 1, N≤M, and M is less than or equal to the maximum quantity of uplink carriers configured for the terminal device, and N is less than or equal to the maximum quantity of uplink carriers supported by the terminal device.

15. The communication apparatus according to claim 14, wherein the uplink capability information further comprises a maximum quantity of channels supported by the terminal device, and the transmitter is further configured to send second information to the terminal device, wherein the second information indicates Q channels, and the Q channels correspond to the N uplink carriers; and
wherein performing the uplink transmission with the terminal device on the N uplink carriers comprises: performing the uplink transmission with the terminal device on the Q channels corresponding to the N uplink carriers, wherein
Q is less than or equal to the maximum quantity of channels supported by the terminal device.

16. The communication apparatus according to claim 14, wherein the transmitter is further configured to send third information to the terminal device, wherein the third information configures, for the terminal device, the M uplink carriers and at least one channel corresponding to each of the M uplink carriers, wherein
- a sum of quantities of channels corresponding to each of the M uplink carriers is less than or equal to a maximum quantity of channels supported by the terminal device.

* * * * *